(12) United States Patent
Masuda

(10) Patent No.: US 7,401,038 B2
(45) Date of Patent: Jul. 15, 2008

(54) STOCK PRICE CHART

(75) Inventor: Tokutaro Masuda, Kanagawa (JP)

(73) Assignee: Masuda Economic Research Institute Ltd., Yokohama-shi (JP)

( * ) Notice: Subject to any disclaimer, the term of this patent is extended or adjusted under 35 U.S.C. 154(b) by 1224 days.

(21) Appl. No.: 10/268,675

(22) Filed: Oct. 11, 2002

(65) Prior Publication Data

US 2003/0074292 A1   Apr. 17, 2003

(30) Foreign Application Priority Data

Oct. 11, 2001   (JP) .............................. 2001-314617

(51) Int. Cl.
*G06Q 40/00*   (2006.01)
(52) U.S. Cl. ........................................................ 705/35
(58) Field of Classification Search ................... 705/37, 705/35
See application file for complete search history.

(56) References Cited

U.S. PATENT DOCUMENTS 6,272,474 B1 *   8/2001   Garcia ...................... 705/36 R

FOREIGN PATENT DOCUMENTS

JP   11-066154 A   3/1999

WO   WO 01/88735   * 11/2001

OTHER PUBLICATIONS

Golden Software, Grapher 3 Product Sheet, (produced from the Web archive: http://web.archive.org/web/20010411111150/www.goldensoftware.com/products/grapher/), Dec. 20, 2000.*

* cited by examiner

*Primary Examiner*—James P. Trammell
*Assistant Examiner*—Abdul Basit
(74) *Attorney, Agent, or Firm*—Westerman, Hattori, Daniels & Adrian, LLP.

(57) ABSTRACT

In a stock price chart in which "sticks" for a predetermined stock brand are arranged in time series on coordinates consisting of a price axis and a time axis, wherein the "sticks" are arranged such that an upper end and a lower end of the "stick" show one of an average closing price for the present evaluation period and an average closing price for the previous evaluation period, respectively, an indication showing a magnitude relationship between an average closing price for the previous evaluation period and an average closing price for the present evaluation period, and a "line" connecting a coordinate point showing a closing price of the present evaluation period and an upper end or a lower end of a "stick" showing an average closing price for the present evaluation period and an indication showing a magnitude relationship between them are added to the "line".

29 Claims, 22 Drawing Sheets

Block diagram showing a structure of a stock price chart preparation apparatus

Block diagram showing a structure of a stock price chart preparation apparatus

*Fig. 2*

| stock brand | first day | | | | | |
|---|---|---|---|---|---|---|
| | date | opening price | highest price | lowest price | closing price | trading volume |

| second day | | | | | |
|---|---|---|---|---|---|
| date | opening price | highest price | lowest price | closing price | trading volume |

| third day | | | | | |
|---|---|---|---|---|---|
| date | opening price | highest price | lowest price | closing price | trading volume |

| fourth day | | | | | |
|---|---|---|---|---|---|
| date | opening price | highest price | lowest price | closing price | trading volume |

| fifth day | | | | | |
|---|---|---|---|---|---|
| date | opening price | highest price | lowest price | closing price | trading volume |

·
·
·
·

| Nth day | | | | | |
|---|---|---|---|---|---|
| date | opening price | highest price | lowest price | closing price | trading volume |

Table showing an example of stock price information

Fig.3 daily stick memory unit 6a

| stock brand | date | third day | | fourth day | | ... | Dth day | |
|---|---|---|---|---|---|---|---|---|
| | | average closing price | closing price of the day | average closing price | closing price of the day | | average closing price | closing price of the day |
| | | short-term \| medium-term \| long-term | | short-term \| medium-term \| long-term | | | short-term \| medium-term \| long-term | | weekly stick memory unit 6b

| stock brand | date | third week | | fourth week | | ... | Wth week | |
|---|---|---|---|---|---|---|---|---|
| | | average closing price | closing price of the day | average closing price | closing price of the day | | average closing price | closing price of the day |
| | | short-term \| medium-term \| long-term | | short-term \| medium-term \| long-term | | | short-term \| medium-term \| long-term | | monthly stick memory unit 6c

| stock brand | date | third month | | fourth month | | ... | Mth month | |
|---|---|---|---|---|---|---|---|---|
| | | average closing price | closing price of the day | average closing price | closing price of the day | | average closing price | closing price of the day |
| | | short-term \| medium-term \| long-term | | short-term \| medium-term \| long-term | | | short-term \| medium-term \| long-term | |

Table showing data contents stored in calculation result memory means

Fig. 4

| date | closing price | average closing price for the last three days | calculation formula of average closing price for the last three days |
|---|---|---|---|
| 1 | 800 | | |
| 2 | 1000 | | |
| 3 | 1200 | 1000 | ( 800 + 1000 + 1200 ) ÷ 3 |
| 4 | 1400 | 1200 | ( 1000 + 1200 + 1400 ) ÷ 3 |
| 5 | 1600 | 1400 | ( 1200 + 1400 + 1600 ) ÷ 3 |
| 6 | 1200 | 1400 | ( 1400 + 1600 + 1200 ) ÷ 3 |
| 7 | 1100 | 1300 | ( 1600 + 1200 + 1100 ) ÷ 3 |
| 8 | 1300 | 1200 | ( 1200 + 1100 + 1300 ) ÷ 3 |
| 9 | 1500 | 1300 | ( 1100 + 1300 + 1500 ) ÷ 3 |
| 10 | 1700 | 1500 | ( 1300 + 1500 + 1700 ) ÷ 3 |

Example of calculation of average closing price

Graph showing an example of
a daily stick short-term line using Masuda stick

Graph showing an example of
a daily stick short-term line using Masuda shadow stick Schematic flow chart showing operation
contents of a stock price chart preparation apparatus Flow chart showing details
of stock price information inputting process Flow chart showing details of calculation process Flow chart showing details of chart preparation process Flow chart showing details of daily stick preparation process Flow chart showing details of stick displaying process Flow chart showing details of shadow displaying process Graph showing an example of stock price chart Graph for explaining estimation of
trend of stock price using Masuda shadow stick of three days An example of stock price chart in which Masuda sticks and Masuda shadow sticks are simultaneously displayed (no. 2)

Graph showing trend estimation of stock price using Masuda shadow stick of twenty-five days

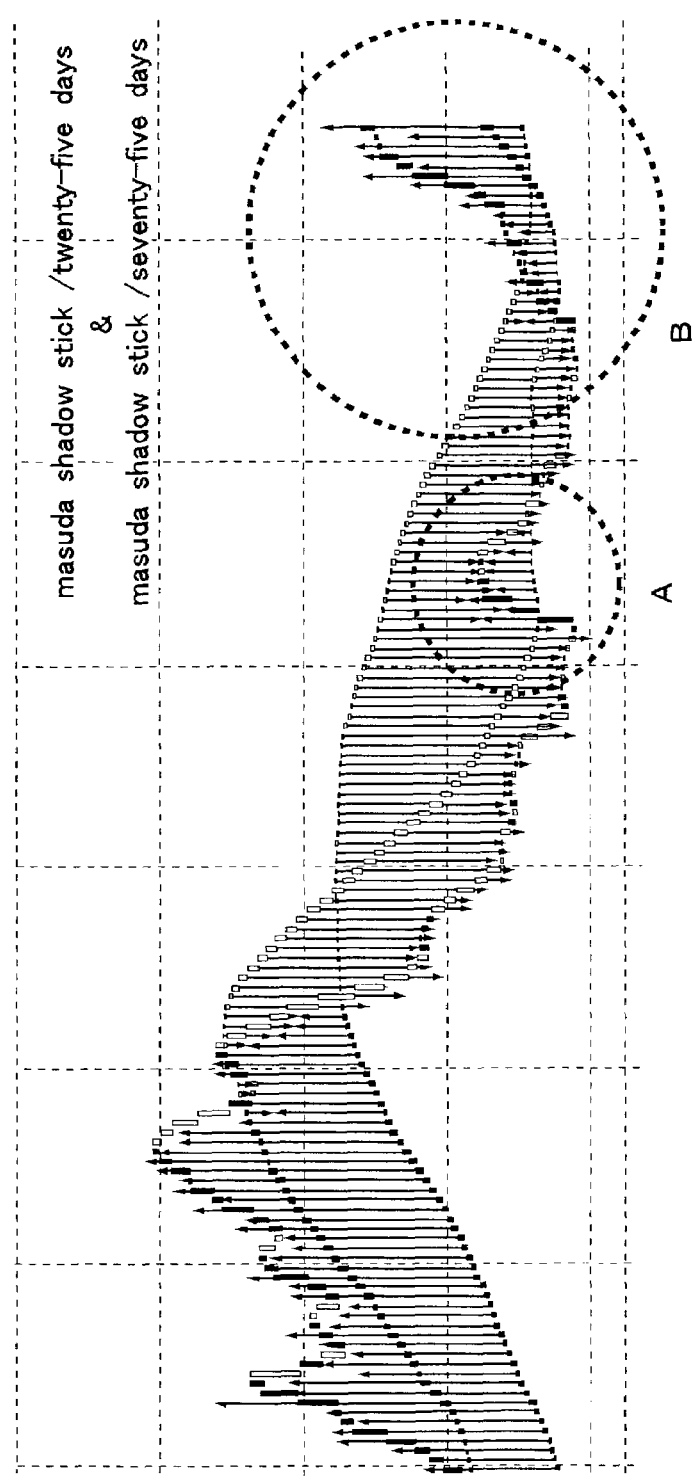

STOCK PRICE CHART

BACKGROUND OF THE INVENTION

1. Field of the Invention

The present invention relates to a stock price chart in which "sticks" for a predetermined stock brand are arranged in time series on coordinates consisting of a price axis and a time axis and, in particular, to a stock price chart in which "sticks" and "lines" are drawn using only closing price data as stock price information.

2. Description of the Related Art

Appropriate decision of timing for selling or buying a stock is a subject common to people participating in stock trading. For this purpose, habitual analysis of a trend of a stock price is indispensable. As an example of most popular means with which people can learn a trend of a stock price, there is a stock price chart that is drawn based on various "sticks" (a candlestick, the Sakata Method of stick analysis, a method of representing stick added in the chart when the price moves conversely exceeding the previous three consecutive sticks). Among them, a stock price chart using candlesticks has been known as a representative stock price chart in Japan for a long time and can be found most frequently on stock price information magazine, the Internet and the like.

In a candlestick, fluctuation of a stock price in a predetermined period is represented by a daily stick, a weekly stick, a monthly stick, an annual stick and the like that use four price data consisting of an 'opening price', a 'highest price', a 'lowest price' and a 'closing price'. More specifically, each stick consists of a rectangular body whose upper end and lower end indicate one of the 'opening price' and the 'closing price' and two "lines" extending in the vertical direction from this body of the stick or the bar which indicate the 'highest price' and the 'lowest price'.

In a candlestick, since four prices that are stock price indexes are simultaneously represented, it is suitable for analysis of a trend of a stock price. However, on the other hand, a problem has been pointed out in that, since each stick tends to be complicated and fluctuate largely, and further, adjacent sticks do not necessarily have a continuity, a beginner in stock trading experiences difficulty in reading the chart and is easily mislead by the fluctuations.

Thus, the applicant devised a new stock price chart in which a 'stick' is drawn using only an average closing price in a predetermined number of days. More specifically, the 'stick' in this stock price chart is drawn as a rectangular bar whose upper end and lower end indicate either one of an average closing price in a predetermined number of days until the present evaluation period (for example, the present day), or an average closing price in a predetermined number of days until the previous evaluation period (for example, the previous day). The applicant named this 'stick' as a 'Masuda stick'.

It has been confirmed that the following effects are obtained in the new stock price chart using this 'Masuda stick'.

(a) Since the 'Masuda stick' has a simple structure drawn with two prices (both of the prices are average closing prices) as upper and lower ends, a short-term line, a medium-term line and a long-term line are simplified compared with the conventional candlestick and can easily be read by even a beginner in stock trading.

(b) Since a price that is to be a stock price index is a moving-average price, a width of fluctuation in the Masuda stick is restricted compared with the conventional candlestick. In addition, since an average closing price for the present evaluation period becomes an 'average closing price for the previous evaluation period', in the next evaluation period, continuity is maintained between adjacent Masuda sticks. Thus, a short-term line, a medium-term line and a long-term line become smooth curves and even a beginner in stock trading can grasp a trend of past stock prices at one glance.

In this new stock price chart, an advantage is obtained in that even a beginner in stock trading can easily read the chart and can grasp a trend of a stock price at one glance as described above. However, it is still difficult to forecast a future trend depending only on this chart, in particular, deciding the timing for selling or buying stocks. For this purpose, complicated work such as observing charts everyday and making comprehensive judgment depending on experiences and intuition is still required.

SUMMARY OF THE INVENTION

The present invention has been devised in view of such problems, and it is an object of the present invention to provide a stock price chart that is easy to read for a beginner in stock trading and is suitable for forecasting a trend of a stock price.

In addition, it is another object of the present invention to provide a stock price chart preparation apparatus that is capable of outputting such a stock price chart to a printer or a display.

Moreover, other objects and operational effects of the present invention will be easily understood by those skilled in the art from the following description of the specification.

BRIEF DESCRIPTION OF THE DRAWINGS

FIG. 2 is a table showing an example of stock price information;

FIG. 3 is a table showing contents stored in calculation result memory means;

FIG. 4 is a table showing an example of calculating average closing prices;

FIG. 22 is a graph showing a method of forecasting a stock price trend using both of medium-term lines and long-term lines using Masuda shadow stick.

DETAILED DESCRIPTION OF THE PREFERRED EMBODIMENTS

Figure 1:
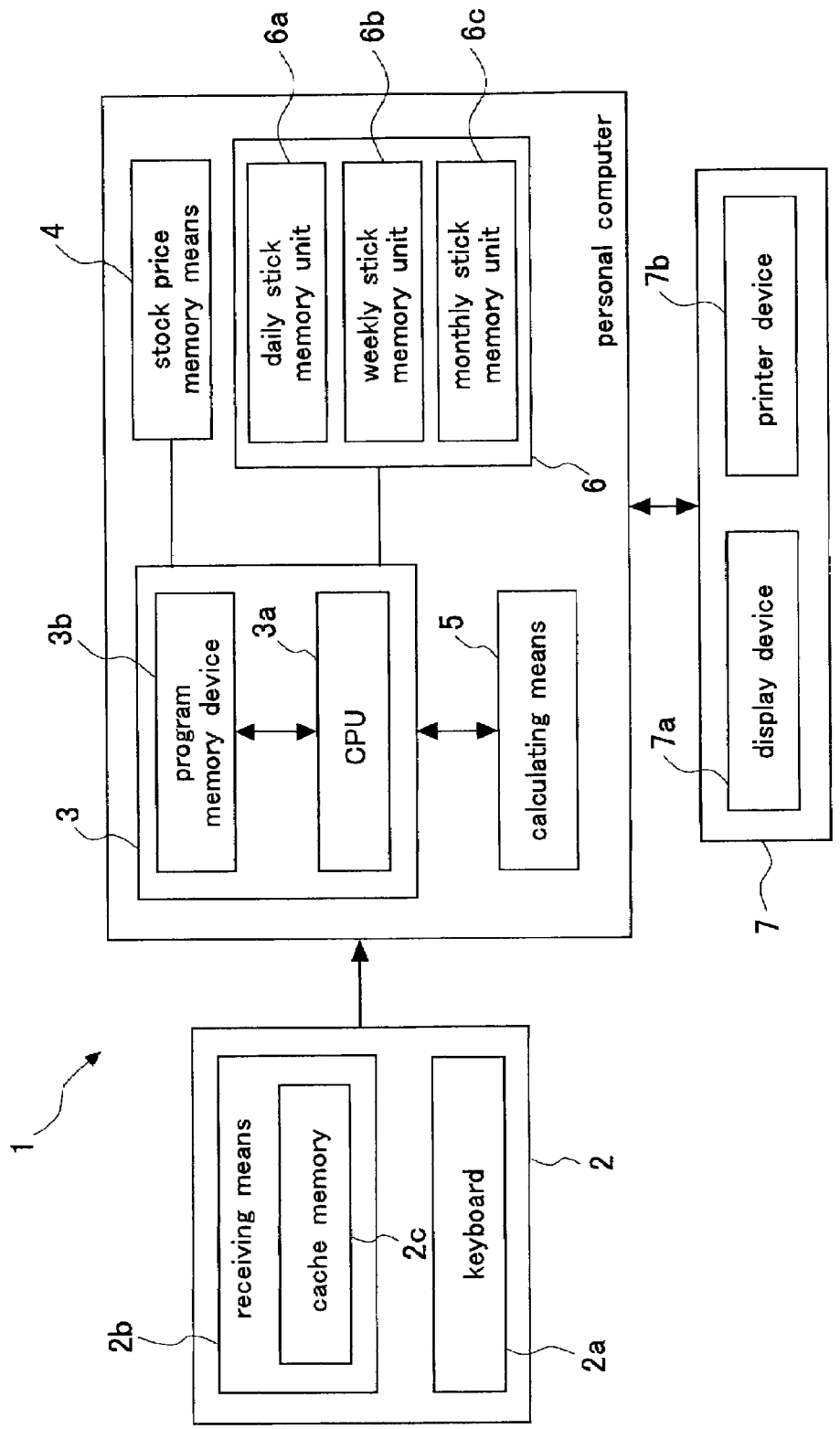
FIG. 1 is a block diagram showing a structure of a stock price chart preparation apparatus.

Preferred embodiments of the present invention will be described with reference to the accompanying drawings.

A first embodiment for solving the above-mentioned problems is realized as a stock price chart in which "sticks" for a predetermined stock brand are arranged in time series on coordinates consisting of a price axis and a time axis.

In this stock price chart, an upper end and a lower end of a "stick" are arranged so as to indicate one of an average closing price of the present evaluation period, which is calculated from a closing price of the present evaluation period and already obtained closing prices for a prescribed period before that, and an average closing price of the previous evaluation period, which is calculated from a closing price of the previous evaluation period and already obtained closing prices for a prescribed period before that, respectively.

Here, 'the present evaluation period' and 'the previous evaluation period', in this context represent two time periods (day, week, month and the like) that continue in a time axis on the chart, respectively. For example, if "sticks" are displayed at the interval of one day, "the present evaluation period" can be defined as the present day and "the previous evaluation period" can be defined as the previous day, and the like. In addition, if "sticks" are displayed at the interval of one week, "the present evaluation period" can be defined as this week and "the previous evaluation period" can be defined as the last week and like. In addition, if "sticks" are displayed at the interval of one month, "the present evaluation period" can be defined as this month and "the previous evaluation period" can be defined as the last month and the like. Further, this definition is only an example, and the definition of "the present evaluation period" and "the previous evaluation period" is not limited to this. However, at least in this context, "sticks" are arranged such that an average closing price for the present evaluation period in an older "stick" of two "sticks" continuous in the time axis direction on the chart, becomes an average closing price for the previous evaluation period in a newer "stick". Therefore, a certain continuity is maintained between the adjacent "sticks" on coordinates.

Added to a "stick" are an indication showing a magnitude relationship between an average closing price for the previous evaluation period and an average closing price for the present evaluation period, and a "line" connecting a coordinate point showing a closing price for the present evaluation period and an upper end or a lower end of the "stick" showing an average closing price for the present evaluation period.

In addition, an indication showing a magnitude relationship between a closing price for the present evaluation period and an average closing price for the present evaluation period is added to a "line".

Further, added indications such as 'character', 'figure', 'symbol' or 'color' can be given as examples of the "indication showing a magnitude relationship between an average closing price for the previous evaluation period and an average closing price for the present evaluation period" of a "stick" or the "indication showing a magnitude relationship between a closing price for the present evaluation period and an average closing price for the present evaluation period" of a "line".

According to the first embodiment of the present invention, since a "stick" is drawn with average closing prices as its upper and lower ends, its fluctuation (change) is restricted compared with a candlestick drawn with actual prices such as an 'opening price' and a 'closing price' as upper and lower ends. In addition, since certain continuity is maintained between adjacent "sticks", a moving line drawn by arranging "sticks" in time series becomes neat and compact compared with that in the case of the candlestick. Therefore, visual recognition of a moving line is improved, and even a beginner in stock trading can grasp a trend in a stock price at one glance. In addition, since a difference between a closing price at the time and an average closing price up to that time is represented by a length of a "line", even a beginner in stock trading can easily grasp momentum of a stock price trend at each time by comparing "lines". Therefore, even a beginner in stock trading can forecast a trend of a stock price relatively easily.

In the first embodiment, preferably, 'colors' are used as the "indication showing a magnitude relationship between an average closing price for the previous evaluation period and an average closing price for the present evaluation period" of a "stick". For example, a first color is applied when a closing price for the present evaluation period is 'higher' than an average closing price for the present evaluation period, and a second color is applied when a closing price for the present evaluation period is 'lower' than an average closing price for the present evaluation period. According to such a form, a trend of a stock price can be known intuitionally not only by vertical fluctuation of a moving line but also by colors.

In the first embodiment, preferably, 'colors' are used as the "indication of a magnitude relationship between a closing price for the present evaluation period and an average closing price for present evaluation period" of a "line". For example, a first color is applied when a closing price for the present evaluation period is 'higher' than an average closing price for the present evaluation period, and a second color when it is 'lower'. According to such a form, momentum of a trend of a stock price at each time can be understood intuitionally by colors as well.

In the first embodiment, preferably, an 'arrow' whose tip is directed to a coordinate point side showing a closing price is added to a "line". According to such a form, the direction (rising or falling) to which a stock price trend is heading at each time, can be intuitionally understood by the 'arrow'.

In the first embodiment, preferably, a plurality of types of "sticks" having different 'prescribed period' for calculating an average closing price are simultaneously drawn on the chart. If the 'prescribed period' is different, a moving line based on each "stick" shows different movements, that is, different natures. In addition, in accordance with this, "lines" displayed additionally to those "sticks" are also different according to a type of "stick" as a matter of course. Therefore, estimating a stock price trend can be performed based on comprehensive judgment by comparing these simultaneously (e.g., examining an appearance pattern (relationship of vertical positions) of moving lines).

Further, as an example of the "plurality of types of "sticks"", two or more types of sticks selected from three types of "sticks" consisting of short-term, medium-term and long-term, in the order of shorter 'prescribed period', drawn simultaneously can be given.

As a more specific example, a simultaneous display of a plurality of sticks using 'daily sticks' having the "prescribed period" defined as immediately preceding three days for "short-term", immediately preceding twenty-five days for "medium-term" and immediately preceding seventy-five days for "long-term" can be given. Further, since the stock exchange is not open everyday (normally closed on weekends and holidays), the above described periods of three days, twenty-five days, and seventy-five days do not include the days when stock trading did not take place.

In addition, as another specific example, a simultaneous display of a plurality of sticks using "weekly sticks" having the 'prescribed period' defined as immediately preceding three weeks for "short-term", immediately preceding thirteen weeks for "medium-term" and immediately preceding twenty-six weeks for "long-term" can be given. Further, in this case, a closing price for one arbitrary day (e.g., Friday) representing the week is adopted as a closing price for each week.

In addition, as another specific example, a simultaneous display of a plurality of sticks using "monthly sticks" having the 'prescribed period' defined as immediately preceding three months for "short-term", immediately preceding twelve months for "medium-term" and immediately preceding thirty-six months for "long-term" can be given. Further, in this case, a closing price for one arbitrary day representing the month is adopted as a closing price for each month.

Further, simultaneous display of a plurality of "sticks" in each of the above-described "daily stick", "weekly stick" and "monthly stick" simply shows a combination that is considered to reflect a trend of a stock price on a chart realistically as a result of earnest researches of the applicant. The combination can be set freely without being limited to these.

Next, a second embodiment of the present invention is a stock price chart in which "sticks" for a predetermined stock brand are arranged in time series on coordinates consisting of a price axis and a time axis. A plurality of types of "sticks" having different 'prescribed period' are drawn, whose upper end and lower end are arranged so as to show one of an average closing price for the present evaluation period calculated from a closing price for the present evaluation period and already obtained closing prices for a prescribed period before that, and an average closing price for the previous evaluation period calculated from a closing price for the previous evaluation period and already obtained closing prices for a prescribed period before that, respectively. Further, an indication showing a magnitude relationship between an average closing price for the previous evaluation period and an average closing price for the present evaluation period, a coordinate point showing a closing price for the present evaluation period, and a "line" connecting an upper end or a lower end of a "stick" showing an average closing price for the present evaluation period are added to one or two or more types of "sticks" selected out of these plurality of types of "sticks". An indication showing a magnitude relationship between a closing price for the present evaluation period and an average closing price for the present evaluation period is added to the "line".

According to the second embodiment of the present invention, moving lines based on a plurality of types of "sticks" having different 'prescribed period' for calculating an average closing price can be compared simultaneously and, at the same time, momentum of a stock price trend at each time can be known for an arbitrary "stick" selected out of these plurality of types of "sticks" by examining the "line" having the additional indication.

Further, as an example of the "plurality of types of "sticks"", two or more types of sticks selected from three types of "sticks" consisting of short-term, medium-term and long-term in the order of shorter 'prescribed period', drawn simultaneously as in the first embodiment can be given.

In the second embodiment, preferably, 'colors' are used as the "indication showing a magnitude relationship between an average closing price for the previous evaluation period and an average closing price for the present evaluation period" of a "stick". For example, a first color is applied when a closing price for the present evaluation period is 'higher' than an average closing price for the present evaluation period, and a second color when it is 'lower'. According to such a form, a trend of a stock price can be known intuitively not only by vertical fluctuation of a moving line but also by colors.

In the second embodiment, preferably, 'colors' are used as the "indication of a magnitude relationship between a closing price for the present evaluation period and an average closing price for the present evaluation period" of a "line". For example, a first color is applied when a closing price for the present evaluation period is 'higher' than an average closing price for the present evaluation period, and a second color when it is 'lower'. According to such a form, momentum of a trend of a stock price at each time can be understood intuitionally by colors as well.

In the second embodiment, preferably, an 'arrow' whose tip is directed to a coordinate point side showing a closing price is added to a "line". According to such a form, the direction (rising or falling) to which a stock price trend is heading at each time, can be intuitively understood by the 'arrow'.

Next, a third embodiment of the present invention is realized as a stock price chart preparation apparatus, whereby a stock price chart according to the first and second embodiments can be prepared automatically.

A stock price chart preparation apparatus according to the third embodiment of the present invention comprising, means for storing closing price data for an inputted predetermined stock brand in time series; calculating means for calculating, for each of a plurality of specified days for which "sticks" should be displayed, an average closing prices of the present evaluation period based on a closing price for the present evaluation period and already obtained closing prices for a prescribed period before that and an average closing price for the previous evaluation period based on a closing price for the previous evaluation period and already obtained closing price for a prescribed period before that; first displaying means for displaying a "stick" having an average closing price for the present evaluation period and an average closing price for the previous evaluation period at either its upper end or lower end in time series on coordinates consisting of a price axis and a time axis together with an indication showing a magnitude relationship between an average closing price for the previous evaluation period and an average closing price for the present evaluation period; and second display means for additionally displaying a "lines" connecting an upper end or a lower end showing an average closing price for the present evaluation period of each "stick" displayed by the first display means and a coordinate point of a closing price at that time on coordinates consisting of a price axis and a time axis together with an indication showing a magnitude relationship between a closing price for the present evaluation period and an average closing price for the present evaluation period.

In the third embodiment, preferably, the stock price chart preparation apparatus further comprises means for specifying one or two or more types of "sticks" that should be displayed from a plurality of types of "sticks" having different 'prescribed period' for calculating an average closing price via user operation; and a function for simultaneously displaying specified "sticks" via the first display means, when two or more types of "sticks" are specified.

In the third embodiment, preferably, the first display means has a function for additionally displaying the specified type of "stick" on the coordinates every time each type of "stick" is specified anew, and erasing the released "stick" from the coordinates every time the specification of each type of "stick" is released.

Here, more preferably, the stock price chart preparation apparatus further comprises means for specifying one or two or more types of "sticks" for which a "line" should be additionally displayed via a user operation out of two or more types of "sticks" displayed, and additionally displaying "line" for each of these specified two or more types of "sticks" via the second displaying means when two or more types of "sticks" for which a "line" should be additionally displayed are specified.

In addition, more preferably, the second display means has a function for, additionally displaying a "line" on the specified type of "stick" every time each type of "stick" for which a "line" should be additionally displayed is specified anew, and erasing a "line" added to the released "stick" from the coordinates every time the specification of each type of "stick" for which a "line" should be additionally displayed is released.

Further, in the third embodiment, a plurality of types of "sticks" having different 'prescribed period' can also be classified into three types consisting of short-term, medium-term and long-term in advance.

In addition, in the third embodiment, preferably, the first display means applies a first color to a "stick" when an average closing price for the present evaluation period is 'higher' than an average closing price for the previous evaluation period, and a second color when it is 'lower', as an indication showing a magnitude relationship.

In addition, in the third embodiment, preferably, the second display means applies a first color to a "line" when a closing price for the present evaluation period is 'higher' than an average closing price for the present evaluation period, and a second color when it is 'lower', as an indication showing a magnitude relationship.

In addition, in the third embodiment, preferably, the second display means adds an 'arrow' whose tip is directed to a coordinate point side showing a closing price to a "line".

Further, although both the stock price chart of the first embodiment and the stock price chart preparation apparatus of the third embodiment target a "stock price", the present invention is applicable not only to a "stock price" but also to other various market prices (prices of receivables, commodity, derivatives, options, warrant or the like).

That is, a fourth embodiment of the present invention is a market chart in which "sticks" for a predetermined market are arranged in time series on coordinates consisting of a price axis and a time axis, wherein an upper end and a lower end of a "stick" are arranged so as to show one of an average closing price for the present evaluation period calculated from a closing price for the present evaluation period and already obtained closing prices for a prescribed period before that and an average closing price for the previous evaluation period calculated from a closing price for the previous evaluation period and already obtained closing prices for a prescribed period before that, and an indication showing a magnitude relationship between an average closing price for the previous evaluation period and an average closing price for the present evaluation period, and a "line" connecting a coordinate point showing a closing price for the present evaluation period and an upper end or a lower end of a "stick" showing an average closing price for the present evaluation period are added to the "stick" and an indication showing a magnitude relationship between a closing price for the present evaluation period and an average closing price for the present evaluation period is added to the "line".

In addition, a fifth embodiment of the present invention is a market chart preparation apparatus that comprises means for storing closing price data for an inputted predetermined market in time series; calculating means for calculating, an average closing price of the present evaluation period based on a closing price for the present evaluation period and already obtained closing prices for a prescribed period before that, and an average closing price for the previous evaluation period based on a closing price for the previous evaluation period and already obtained closing prices for a prescribed period before that, for each of a plurality of specified days (which vary depending on day, week or month) for which "sticks" should be displayed; first display means for displaying a "stick" having an average closing price for the present evaluation period and an average closing price for the previous evaluation period at either its upper end or lower end, in time series on coordinates consisting of a price axis and a time axis together with an indication showing a magnitude relationship between an average closing price for the previous evaluation period and an average closing price for the present evaluation period; and second display means for additionally displaying a "shadow" connecting an upper end or a lower end showing an average closing price for the present evaluation period of each "stick" displayed by the first display means and a coordinate point of a closing price at that time on coordinates consisting of a price axis and a time axis, together with an indication showing a magnitude relationship between a closing price for the present evaluation period and an average closing price for the present evaluation period.

A preferred embodiment of the present invention will be hereinafter described in detail in accordance with the attached drawings.

A functional structure of a stock price chart preparation apparatus, which is an embodiment of the present invention, is schematically shown in a block diagram of FIG. 1. As shown in the figure, this stock price chart preparation apparatus 1 includes input means 2 for inputting stock price information, processing means 3 constituted by a CPU and the like, stock price memory means 4 for storing inputted stock price information, calculating means 5 for calculating stick data based on stock price information stored in the stock price memory means 4, calculation result memory means 6 for storing calculation results, and output means 7 for outputting a stock price chart, which is based on stick data stored in the calculation result memory means 6, to a display and the like.

In this embodiment, the stock price chart preparation apparatus 1 is constituted by a personal computer. The processing means 3, the stock price memory means 4, the calculating means 5 and the calculation result memory means 6 are realized by this personal computer.

The input means 2 includes a keyboard 2a, a not-shown mouse and the like. The keyboard 2a is used not only for registration of company information, inputting stock price information of a company on demand, and the like but also as the output means 7 discussed later, for inputting the stock brand (or a stock brand code for convenience' sake) upon displaying a chart of a desired stock brand on a display device 7a.

In Japan, the number of stock brands handled at stock exchanges reaches 3000 including OTC stock brands. It requires a lot of time and labor to manually input stock price information for all of these stocks from the keyboard 2a at or after 3 p.m. when closing prices are released, and input mistakes are inevitable. Thus, on-line receiving means 2b is provided for taking in stock price information provided by the stock exchanges on-line. Further, a cache memory 2c is used as temporary memory means for stock information taken in via the on-line receiving means 2b.

The processing means 3 is mainly constituted by a CPU (central processing unit) 3a. A program memory device 3b is constituted by a ROM, a RAM or the like, in which various programs (a stock price information input program, a calculation program, a stock price chart preparation program and the like) that are used in the stock price chart preparation apparatus 1 are stored. The CPU 3a controls each element of the stock price chart preparation apparatus 1 in accordance with the programs stored in this program memory device 3b.

The stock price memory means 4 is realized by a hard disk (partly allocated memory area) provided inside the personal computer in this embodiment. Stock price information taken in via the receiving means 2b is sequentially stored in this stock price memory means 4 for each stock brand registered in advance. FIG. 2 shows an example of stock price information stored in the stock price memory means 4. A date when the stock information is obtained and stock price information comprising an 'opening price', a 'highest price', a 'lowest price', a 'closing price' and a 'trading volume' are stored as the data for one day with respect each stock brand. Further, the date becomes necessary in specifying the stock prices (closing prices) of the present day, the previous day and of two days prior, when the calculating means 5 discussed later performs, for example, calculation of a short-term average closing price.

In this embodiment, as described later, daily stick data for the latest 450 days, weekly stick data for the latest 192 weeks and monthly stick data for the latest 176 months are used for preparing a daily stick stock price chart, a weekly stick stock price chart and a monthly stick stock price chart, respectively. Thus, at least stock price information for N days required for performing these calculations are stored in the stock price memory means 4.

Further, in this embodiment, stock price information essential for preparing a stick or a stock price chart is only "closing price data". However, in this example, stock price information other than a closing price is simultaneously stored in the stock price memory means 4 as described above since other stock price information is also numerically displayed or otherwise displayed on a display. In addition, although data from the "first day" to the "Nth day" are shown in the figure, "dates" are not always consecutive since stock price information is not obtained in such days as Saturday, Sunday and national holidays when stock trading is not performed.

The calculating means 5 mainly reads out stock price information stored in the stock price memory means 4 and performs calculation process corresponding to the stock price information in accordance with a procedure of a calculation program stored in the program memory device 3a. This calculation process is a process for calculating stick data (a short-term average closing price, a medium-term average closing price and a long-term average closing price), which are required for preparing a "Masuda stick" used in this embodiment, based on closing price data of a predetermined period (prescribed number).

The 'Masuda stick' used in this embodiment will be described hereinafter.

In this embodiment, the "Masuda stick" is classified into three types, a daily stick, a weekly stick and a monthly stick, according to an interval for preparing them. Further three types of sticks (a short-term stick, a medium-term stick and a long-term stick) with different numbers of closing prices used (prescribed numbers) in stick data calculation can be prepared for each of the various types of "sticks". Thus, in this example, total of nine types of Masuda stick, namely, a short-term daily stick, a medium-term daily stick, a long-term daily stick, a short-term weekly stick, a medium-term weekly stick, a long-term weekly stick, a short-term monthly stick, a medium-term monthly stick and a long-term monthly stick, can be prepared.

In this example, a 'daily stick' is prepared based on an average price for the prescribed number of closing price data obtained everyday at 3 p.m. (a daily stick data, which varies for a short-term, a medium-term and a long-term).

In addition, a 'weekly stick' is prepared based on an average price for the prescribed number of closing price data (weekly stick data) obtained on the last day of stock trading of every week (mainly Friday). Further, in this example, closing price data of the latest day is regarded as closing price data of the last day of the week to prepare latest weekly stick data appropriately until the last day of stock trading of the week arrives.

A 'monthly stick' is prepared based on an average price for the prescribed number of closing price data obtained on the last day of stock trading in each month (monthly stick data). Further, in this example, closing price data of the latest day is regarded as closing price data of the last day of the month to prepare latest monthly stick data appropriately until the last day of stock trading of the month arrives.

In all of 'daily stick', 'weekly stick' and 'monthly stick', a "short-term stick" is prepared based on a short-term average closing price for the present evaluation period (short-term stick data of the present evaluation period) and a short-term average closing price (short-term stick data of the previous evaluation period) for the previous evaluation period (since dates are not continuous, it is not always the 'previous day'). This "short-term stick" is arranged in time series on coordinate axes consisting of a price axis and a time axis, whereby a "short-term line" is drawn.

A "medium-term stick" is prepared based on a medium-term average closing price for the present evaluation period and a medium-term average closing price for the previous evaluation period. This "medium-term stick" is arranged in time series on coordinate axes consisting of a price axis and a time axis, whereby a "medium-term line" is drawn.

A "long-term stick" is prepared based on a long-term average closing price for the present evaluation period and a long-term average closing price for the previous evaluation period. This "long-term stick" is arranged in time series on coordinate axes consisting of a price axis and a time axis, whereby a "long-term moving line" is drawn.

Further, in the following description, a short-term moving line, a medium-term moving line and a long-term moving line are collectively referred to as a 'moving line'.

In this example, a "short-term average closing price" as short-term daily stick data is calculated as an average price for already obtained closing prices for total of three days, which are a closing price for the present day and closing prices for the immediately preceding two days. A "medium-term average closing price" as short-term daily stick is calculated as an average price for already obtained closing prices for total of twenty-five days, which are a closing price for the day (present evaluation period) and closing prices for the immediately preceding twenty-four days. A "long-term average closing price" as short-term daily stick data is calculated as already obtained average closing prices for total of seventy-five days, which are a closing price for the day (present evaluation period) and closing prices for the immediately preceding seventy-four days.

In this example, a "short-term average closing price" as short-term weekly stick data is calculated as an average price for already obtained closing prices for total of three weeks, which are a closing price for the week (present evaluation period) and closing prices for the immediately preceding two weeks. A "medium-term average closing price" as medium-term weekly stick data is calculated as an average price for already obtained closing prices for total of thirteen weeks, which are a closing price for the week and closing prices for the immediately preceding twelve weeks. A "long-term average closing price" as long-term weekly stick data is calculated as an average price for already obtained closing prices for total of twenty-six weeks, which are a closing price for the week and closing prices for the immediately preceding twenty-five weeks.

In this example, a "short-term average closing price" as short-term monthly stick data is calculated as an average price for already obtained closing prices for total of three months, which are a closing price for the month (present evaluation period) and closing prices for the immediately preceding two months. A "medium-term average closing price" as medium-term monthly stick data is calculated as an average price for already obtained closing prices for total of twelve months, which are a closing price for each month and closing prices for the immediately preceding eleven months. A "long-term average closing price" as long-term monthly stick data is calculated as an average price for already obtained closing prices for total of thirty-six months, which are a closing price for each month and closing prices for the immediately preceding thirty-five months.

The calculating means 5 calculates the above-mentioned daily stick data, weekly stick data and monthly stick data and stores the data in a daily stick memory unit, a weekly stick memory unit and a monthly stick memory unit of the calculation result memory means 6 shown in FIG. 1, respectively.

FIG. 3 shows contents of data to be stored in a daily stick memory unit 6a, a weekly stick memory unit 6b and a monthly stick memory unit 6c of the calculation result memory means 6, respectively.

As shown in the figure, short-term, medium-term and long-term average closing prices in the third day to the Dth day (assuming that the Dth day is the latest day) and a closing price for each day (a closing price for the present evaluation period) are stored for each stock brand in the 'daily stick memory unit 6a' together with a date of each day. In addition, closing price stored here, and closing price stored in the stock price memory means 4 as stock price information are the same. However, in this example, a closing price is also saved in the calculation result memory means 6 in order to smoothly perform preparation of a "shadow line" discussed later in addition to preparation of a Masuda stick.

Further, a 'date' is a day to be a reference for calculation of daily stick data. For example, if a short-term average closing price in a daily stick is to be calculated, a day corresponding to the third day (if the day is July 10, stock prices (closing prices) of July 9 and July 8 are required for calculation, and in this case, the day when the short-term average closing price is calculated, which is July 10) is stored.

Further, data begins on the "third day". This is because average closing prices for the preceding two days are required for calculation of a short-term average closing price as daily stick data. Due to the same reason, a medium-term average closing price is stored on or after the twenty-fifth day, and a long-term average closing price is stored on or after the seventy-fifth day.

Short-term, medium-term and long-term average closing prices for each week from the third week to the Wth week and a closing price for each week (closing price for a day that is regarded as a last day of the week) are stored for each stock brand in the 'weekly stick memory unit 6b' together with a date.

Further, a 'date' is a day to be a reference for calculation of weekly stick data. For example, if a short-term average closing price in a weekly stick is to be calculated, a day corresponding to the third week (if the day is July 10, for example, stock prices (closing prices) of July 2 that is a date in the last week and June 25 that is a date in the week before last are required for calculation and, in this case, the day when the average closing price is calculated, which is July 10) is stored. Further, data in the weekly stick memory unit begins in the "third week". This is because average closing prices for the preceding two weeks are required for calculation of a short-term average closing price as weekly stick data. Due to the same reason, a medium-term average closing price is stored on or after the thirteenth week, and a long-term average closing price is stored on or after the twenty-sixth week.

Short-term, medium-term and long-term average closing prices for each month from the third month to the Mth month and a closing price for each month (closing price for a day that is regarded as the last day of the month) are stored for each stock brand in the 'monthly stick memory unit 6c' together with a date.

Further, a 'date' is a day to be a reference for calculation of monthly stick data. For example, if a short-term average closing price in a monthly stick is to be calculated, a day corresponding to the third month (if the day is July 31, for example, stock prices (closing prices) of June 30 that is a date in the last month and May 31 that is a date in the month before last are required for calculation and, in this case, the day when the average closing price is calculated, which is July 31) is stored. Further, data in the monthly stick memory unit begins in the "third month". This is because average closing prices for the preceding two months are required for calculation of a short-term average closing price as monthly stick data. Due to the same reason, a medium-term average closing price is stored on or after the twelfth month, and a long-term average closing price is stored on or after the thirty-sixth month.

As an example of a specific form of calculating the above-mentioned stick data (average closing price), a form of calculating a short-term average closing price for preparation of a short-term daily stick (hereinafter referred to as an average closing price for the last three days including the day) is shown in FIG. 4.

As shown in the figure, an average closing price for the last three days including the day in each day is found in accordance with the following expression (Expression 1):

Average closing price for the last three days including the day=(Closing price for the day+Closing price for the previous day+Closing price for the day before)÷3   [Expression 1]

(Expression 1)

More specifically, as shown in FIG. 4, an average closing price for the last three days including the day at the point of the third day is found as (800+1000+1200)÷3=1000; an average closing price for the last three days including the day at the point of the fourth day is found as (1000+1200+1400)÷3=1200;

an average closing price for the last three days including the day at the point of the fifth day is found as (1200+1400+1600)÷3=1400; and average closing prices for the last three days including the day on or after the sixth day are found in the same manner.

Figure 5:
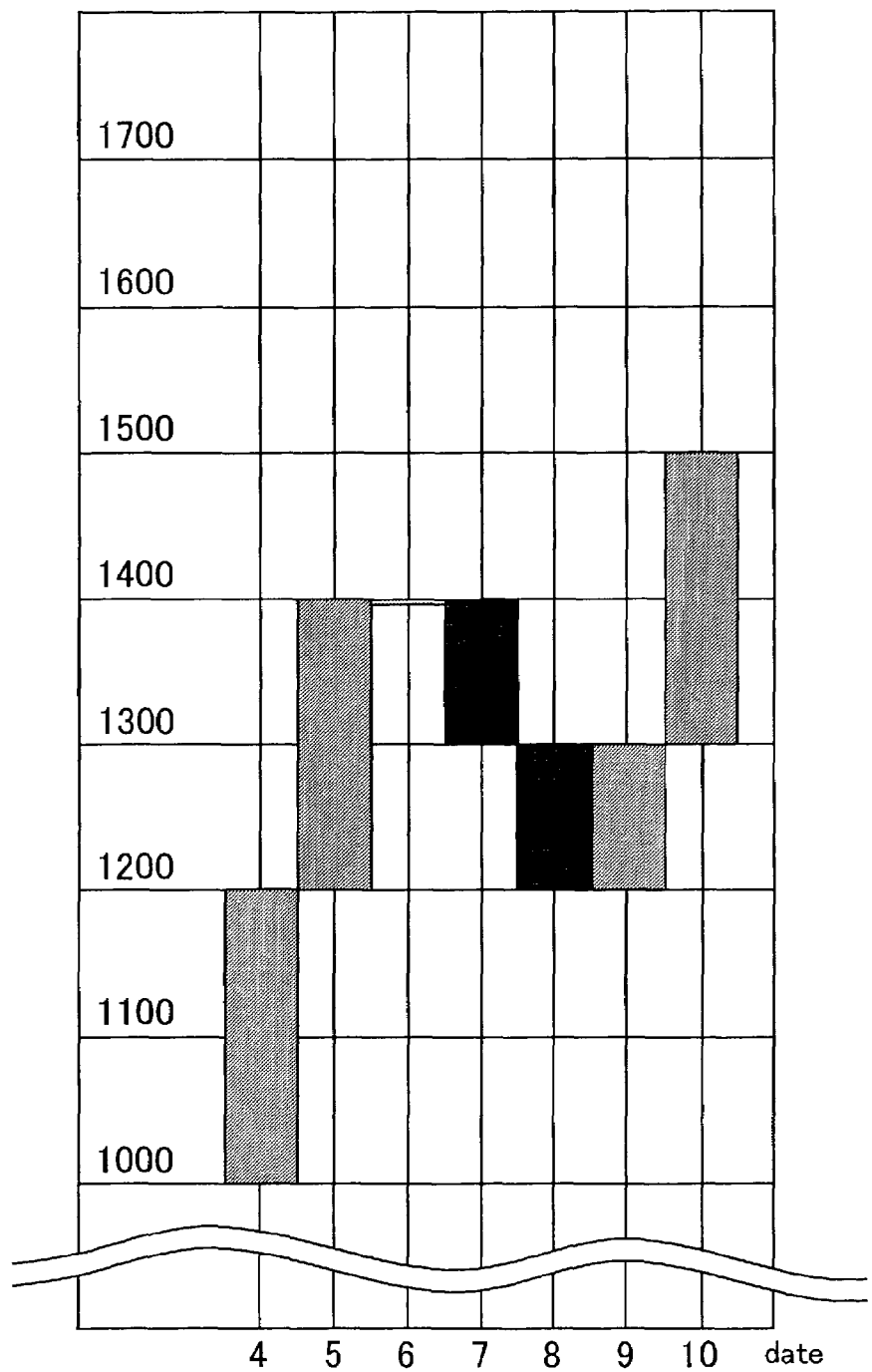
FIG. 5 is a graph showing an example of daily stick short-term lines using a Masuda stick.

FIG. 5 is a graph (partly enlarged graph) showing an example of a short-term line of a daily stick (an example of a stock price chart) that is drawn by arranging a Masuda stick, which is prepared using average closing prices for the last three days including the day (short-term daily stick: hereinafter referred to as a Masuda stick for three days) in the third day to the tenth day obtained in this way, in time series on coordinates consisting of a price axis and a time axis. As shown in the figure, in this example, the Masuda stick of three days is drawn as a vertical bar (rectangular body of the bar) of a corresponding length, which has an average closing price for the last three days including the day for the day (average closing price for the present evaluation period) and an average closing price for the last three days including the day for the previous day (average closing price for the previous day) as an upper line or a lower line, respectively, on coordinates with the vertical axis as a price and the horizontal axis as a date.

More specifically, a Masuda stick of three days on the fourth day is drawn as a vertical bar with 1200 that is an average closing price for the last three days including the day for the fourth day as an upper line and 1000 that is an average closing price for the last three days including the day for the third day as a lower line. In this way, a case in which an average closing price for the last three days including the present day as the day is higher than an average closing price for the last three days including the previous day for the day is referred to as a 'positive stick'. In this embodiment, a vertical bar is colored in pink as a representation indicating the 'positive stick' in this case.

A Masuda stick of three days on the fifth day is drawn as a vertical bar in pink with 1400 that is an average closing price of the last three days for the fifth day as an upper line and 1200 that is an average closing price of the last three days for the fourth day as a lower line.

A Masuda stick of three days on the sixth day is drawn with one horizontal line in pink that is the same as the line for the fifth day (immediately preceding day) because both the average closing price of the last three days for the sixth day and the average closing price of the last three days for the fifth day are 1400.

Masuda stick of three days on the seventh day is drawn as a vertical bar with 1300 that is an average closing price of the last three days for the seventh day as a lower line and 1400 that is an average closing price of the last three days for the sixth day as an upper line. In this way, a case in which an average closing price of the last three days for the present day is lower than an average closing price of the last three days for the previous day is referred to as a 'negative stick'. In this embodiment, a vertical bar is colored in blue as a representation indicating the 'negative stick' in this case.

In the same manner, Masuda stick of three days for the eighth, ninth and tenth days are drawn as vertical bars, and each stick is colored in pink or blue indicating a 'positive stick' or a 'negative stick'.

In this way, a short-term line of a daily stick in this embodiment is drawn by sequentially coupling a Masuda stick for three days (details of which will be described later) that is prepared based on an average closing price of the last three days calculated from closing price of the present evaluation period and closing prices of the immediately preceding two days, and an average closing price for the three days calculated from closing price of the previous evaluation period and closing prices of the immediately preceding two days. Further, the short-term line of a daily stick is regarded as particularly preferable for finding sudden rise, sudden fall and changes in a stock price.

In addition, a medium-term line of a daily stick is drawn by sequentially coupling a Masuda stick for twenty-five days that is prepared based on an average closing price of the last twenty-five days calculated from closing price of the present evaluation period and closing prices of the immediately preceding twenty-four days, and an average closing price of the twenty-five days calculated from closing price of the previous evaluation period and closing prices of the immediately preceding twenty-four days in the same manner. Further, the medium-term line of a daily stick is regarded as particularly preferable for finding medium-term change, strength and directionality of a stock price.

In addition, a long-term line of a daily stick is drawn by sequentially coupling a Masuda stick for seventy-five days that is prepared based on an average closing price of the last seventy-five days calculated from closing price of the present evaluation period and closing prices of the immediately preceding seventy-four days, and an average closing price of the seventy-five days calculated from closing price of the previous evaluation period and closing prices of the immediately preceding seventy-four days in the same manner. Further, the long-term line of a daily stick is regarded as particularly preferable for finding medium-term and long-term change, strength and directionality of a stock price.

On the other hand, a short-term line, a medium-term line and a long-term line by a "weekly stick" of a Masuda stick (not shown) are used for finding medium-term and long-term trends of a stock price.

In this example, a short-term line of a weekly stick is drawn by sequentially coupling a Masuda stick for three weeks that is prepared based on an average price (an average closing price for the last three weeks) calculated from closing price of each week (closing price of this week: a closing price of a collection day of each week in this example) and closing prices of the immediately preceding two weeks (in this example, closing prices that are obtained on Friday of the last week and Friday of the week before last), and an average price calculated from closing price of the last week and closing prices of the immediately preceding two weeks. The short-term line of a weekly stick is regarded as preferable for finding more moderate change than a daily stick.

In this example, a medium-term line of a weekly stick is drawn by sequentially coupling a Masuda stick for thirteen weeks that is prepared based on an average price (an average closing price for the last thirteen weeks) calculated from closing price of each week and closing prices of the immediately preceding twelve weeks, and an average closing price calculated from closing price of the last week and closing prices of the immediately preceding twelve weeks. The medium-term line of a weekly stick is regarded as particularly preferable for finding a medium-term trend of stock trading.

In this example, a long-term line of a weekly stick is drawn by sequentially coupling a Masuda stick for twenty-six weeks that is prepared based on an average price (an average closing price for the last twenty-six weeks) calculated from closing price of each week and closing prices of the immediately preceding twenty-five weeks, and an average closing price calculated from closing price of the last week and closing prices of the immediately preceding twenty-five weeks. The long-term line of a weekly stick is regarded as particularly preferable for finding a long-term trend of stock price.

In addition, a short-term line, a medium-term line and a long-term line by a monthly stick (not shown) are used for finding a long-term trend of a stock price.

In this example, a short-term line of a monthly stick is drawn by sequentially coupling a Masuda stick for three months that is prepared based on an average price calculated from closing price of each month (closing price of this month: a closing price of the last day in each month in this example) and closing prices of the immediately preceding two months (in this example, closing prices of the last day in the last month and the last day of the month before last). The long-term line of a monthly stick is regarded as particularly preferable for finding a more moderate change than a weekly stick.

In this example, a medium-term line of a monthly stick is drawn by sequentially coupling a Masuda stick for twelve months that is prepared based on an average price calculated with closing price of a reference month (a closing price of the last day of a reference month) and closing prices of the immediately preceding eleven months (in this example, closing prices of the last day of the last month and the last day of the month before last). With the medium-term line of a monthly stick, a medium-term trend of stock trading can be found from a long-term perspective longer than the weekly stick.

In this example, a long-term line of a monthly stick is drawn by sequentially coupling a Masuda stick for thirty-six months that is prepared based on an average price calculated from closing price of a reference month (in this example, a closing price of the last day of a reference month) and closing prices of the immediately preceding thirty-five months (in this example, closing prices of the last day of the last month and the last day of the month before last). With the long-term line of a monthly stick, a long-term trend of a stock price can be found from a long-term perspective longer than a weekly stick.

Further, as it can be seen from FIG. 5, in this embodiment, since an 'average closing price for the present evaluation period' defining an upper line or a lower line of each Masuda stick becomes an 'average closing price for the previous evaluation period' defining an upper line or a lower line of a Masuda stick of the next evaluation period, certain continuity is maintained between adjacent Masuda sticks. Thus, all of a short-term line, a medium-term line and a long-term line according to each of a daily stick, a weekly stick and a monthly stick are drawn as unbroken curves, and a stock price chart that is extremely easy to read even for a beginner in stock trading is provided.

Referring back to FIG. 1 again, the output means 7 will be described hereinafter. The output means 7 is comprising of the display device 7a and the printer device 7b that are connected to the personal computer. The display device 7a displays an input screen for inputting a stock price or information on a stock price from the input means 2, outputs and displays a stock price chart utilizing the above-described Masuda stick that is prepared based on stick data stored in the calculation result memory means 6 in accordance with a program stored in the program memory device 3a provided in the processing means 3 onto the screen. The printer device 7b directly outputs a stock price chart displayed on the display device 7a and a stock price chart utilizing the above-described Masuda stick that is prepared based on stick data stored in the calculation result memory means 6. Further, the display device 7a and the printer device 7b has the capability to utilize color, thereby coloring of a Masuda stick in pink and blue can be realized.

Next, in this embodiment, it is possible to additionally display a 'line' extended to a coordinate point indicating a closing price of the present evaluation period in each Masuda stick on coordinates when displaying a stock price chart.

Figure 6:
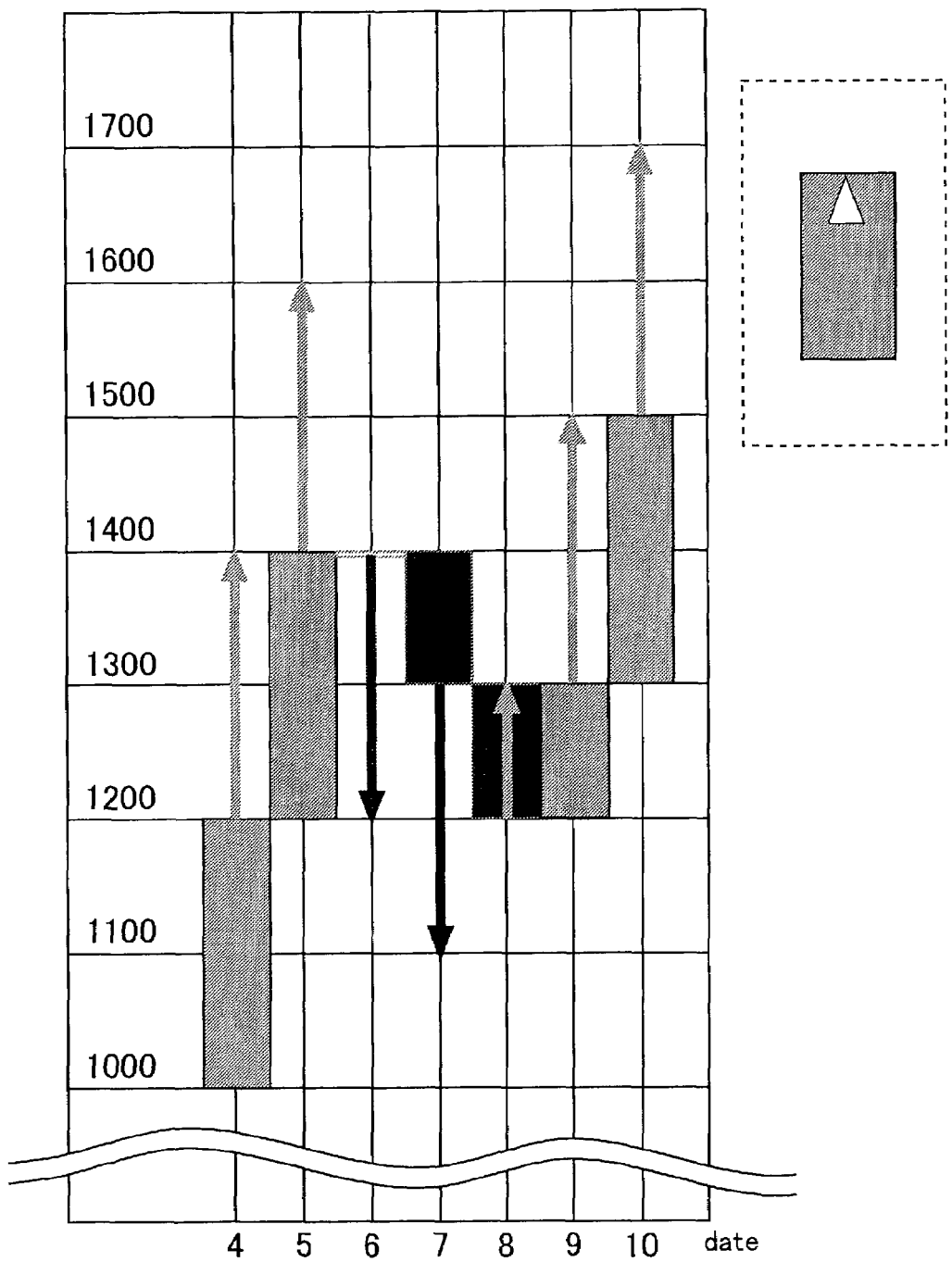
FIG. 6 is a graph showing an example of daily stick short-term line using a Masuda stick.

FIG. 6 is a graph (partly enlarged graph) showing an example (an example of a stock price chart) of a short-term line of a daily stick by a Masuda stick that is prepared with the addition of such a 'line' (hereinafter referred to as "shadow line"). Further, this graph shows a case in which a "shadow line" is added to the Masuda stick of three days shown in FIG. 5.

As shown in the graph, the "shadow line" is drawn as an arrow line connecting an upper line or a lower line of a Masuda stick indicating an average closing price of the day and a closing price of the day. The tip of the arrow is displayed as pointing (positioned) on the coordinates indicating a closing price of the day. Further, closing price data at this point is read from the calculation result memory means 6 as described above.

More specifically, a shadow line added to the Masuda stick of three days on the fourth day in the same graph is drawn by connecting an upper line of a Masuda stick indicating 1200 which is an average closing price for a reference day, and a coordinate point indicating 1400 which is a closing price for the reference day. The tip of the arrow is drawn as positioned on a coordinate point indicating 1400 that is the closing price of the reference day. In this way, the shadow line is colored in pink in this example when the closing price of the reference day is larger than the average closing price of the reference day (in this example, when the shadow line is upward). In this embodiment, the shadow line in this case is referred to as a 'positive shadow line'.

A shadow line added to the Masuda stick body of three days on the fifth day is drawn by connecting an upper line of a Masuda stick indicating 1400 which is an average closing price of the reference day, and a coordinate point indicating 1600 which is a closing price of the reference day. The tip of the arrow is drawn as positioned on a coordinate point indicating 1600 which is the closing price of the reference day. Since this shadow line is a 'positive shadow line', it is colored in pink in the same manner as the first day.

A shadow line added to the Masuda stick of three days on the sixth day is drawn by connecting a Masuda stick (single line) indicating 1400 which is an average closing price of a reference day and a coordinate point indicating 1200 which is a closing price of the reference day. The tip of the arrow is drawn as positioned on a coordinate point indicating 1200 which is the closing price for the reference day. In this way, the shadow line is colored in blue in this example when the closing price of the reference day is smaller than the average closing price of the reference day (in this example, when the shadow is downward). In this embodiment, the shadow line in this case is referred to as a 'negative shadow line'.

A shadow line added to the Masuda stick of three days on the seventh day is drawn by connecting a lower line of a Masuda stick indicating 1300 which is an average closing price of a reference day and a coordinate point indicating 1100 that is a closing price of the reference day. The tip of the arrow is drawn as positioned on a coordinate point indicating 1100 which is the closing price of the reference day. Since this shadow line is a 'negative shadow line', it is colored in blue in the same manner as the third day.

A shadow added to the Masuda stick of three days on the eighth day is drawn by connecting a lower line of a Masuda stick indicating 1200 which is an average closing price of a reference day and a coordinate point indicating 1100 which is a closing price of the reference day. The tip of the arrow is drawn as positioned on a coordinate point indicating 1300 which is the closing price of the reference day. Since this shadow line is a 'negative shadow line', it is colored in blue in the same manner as the third day. Further, as shown in this example, if an average closing price for the previous day and a closing price for a reference day are the same, a shadow line is drawn as entering within a Masuda stick. However, in this case, since the Masuda stick and the shadow line are in different colors, the inconvenience that the shadow line is buried under the Masuda stick does not occurs.

Similarly, shadow lines of the ninth day and the tenth day are drawn in pink indicating a 'positive shadow line'.

Further, if an average closing price of the present evaluation period and a closing price of the present evaluation period are the same, a shadow line is drawn only by an arrow head in this example. A Masuda stick shown in a broken line frame at the upper right in the graph shows a form of displaying this arrow head as an example. The arrow head is drawn in the Masuda stick such that its tip is positioned in the average closing price of the present evaluation period (=the closing price of the present evaluation period). In this case, white (a void) that is different from pink and blue is applied to the shadow line (arrow head).

Further, the applicant named a Masuda stick to which a shadow line is added as a 'Masuda shadow stick'. Then, according to the Masuda shadow stick, a difference between an average closing price of the present evaluation period and a closing price of the present evaluation period and increasing or decreasing direction of them (distinction of rising and falling) are indicated by a length and a color of a shadow line and a direction of an arrow. That is, a shadow line can be grasped as a vector indicating momentum (conceptual fluctuation energy) of stock price fluctuation of the day with stock prices in the past (an average closing price in a predetermined period) as a reference. Consequently, according to the Masuda shadow stick, even a beginner in stock trading can easily grasp momentum of a trend of a stock price at each point of time and can effectively utilize it for estimating a trend of the stock price thereafter.

In particular, if a plurality of these shadow lines (of the same color) continues in a sequence in the direction of a time axis, a visual pseudo surface (same color shadow line region) is formed. This pseudo surface realistically represents a trend of a stock price at each point of time by its color and area. Therefore, a user can find a zone (period) when he/she may buy the stock and a zone (period) when he/she should not buy the stock according to the area (or shape) and color of this pseudo surface.

Moreover, a user can find an immediate point of change in a stock price earlier with a high probability by referring to a short-term line (all of a daily stick, a weekly stick and a monthly stick) using a Masuda shadow stick. Details of this will be described specifically with reference to the drawings later.

Next, the content of the operation process of the stock price chart preparation apparatus 1 for preparing a stock price chart, according to a Masuda stick or a Masuda shadow stick described above, will be described with reference to flow charts of FIGS. 7 to 13.

Figure 7:
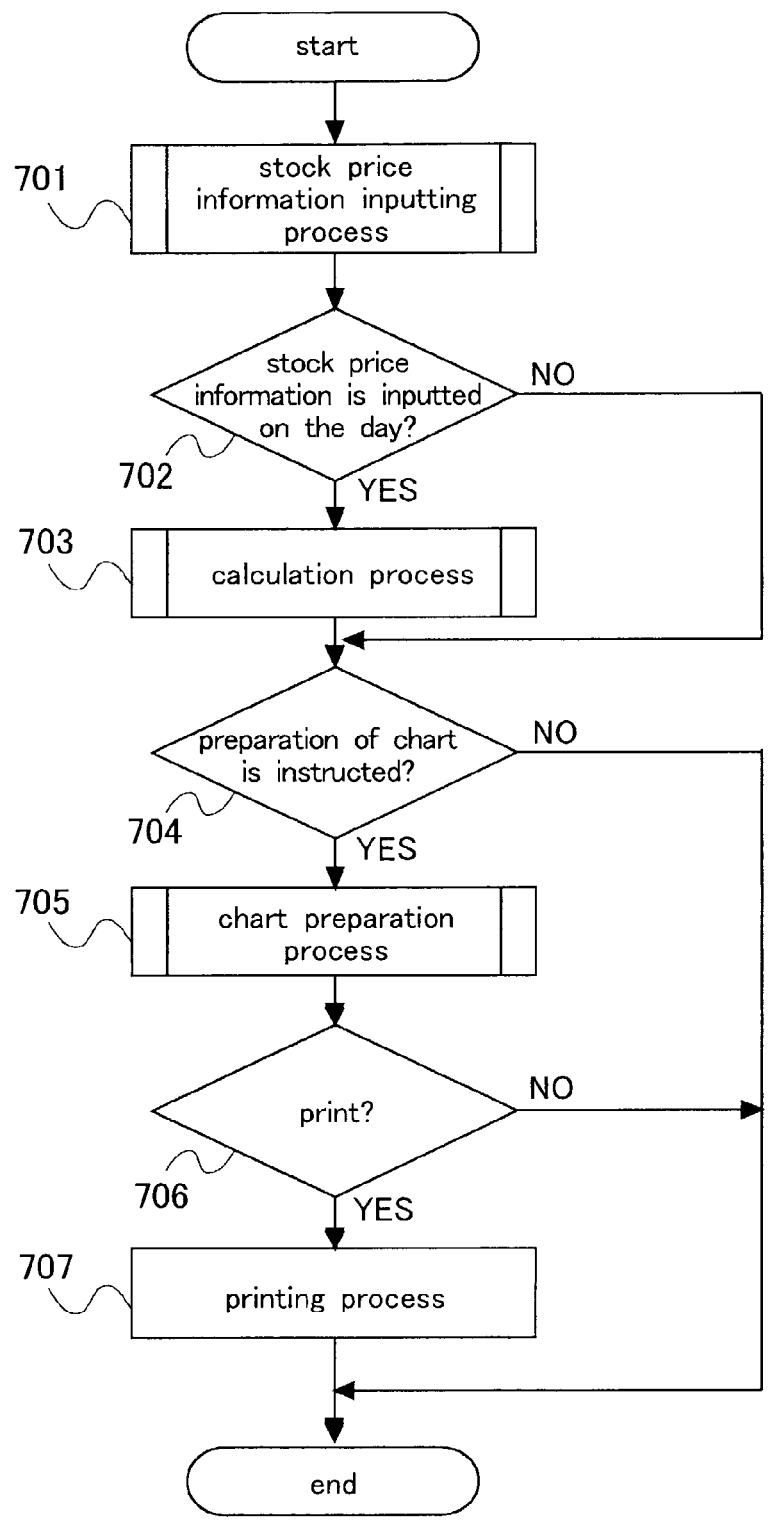
FIG. 7 is a schematic flow chart showing operation contents of the stock price chart preparation apparatus.

FIG. 7 is a flow chart schematically showing the operation process of the stock price chart preparation apparatus 1.

As shown in the figure, the process by the stock price chart preparation apparatus 1 includes inputting process (step 701), calculation process (step 703) that is executed on condition that stock price information is inputted in the day (step 702), chart preparation process (step 705) that is executed on condition that preparation of the chart is instructed (step 704), and printing process (step 707) that is executed on condition that printing is instructed (step 706). Further, since the printing process in this embodiment is for directly outputting a stock price chart displayed on a display by step 705, the process will not be described in detail here.

Figure 8:
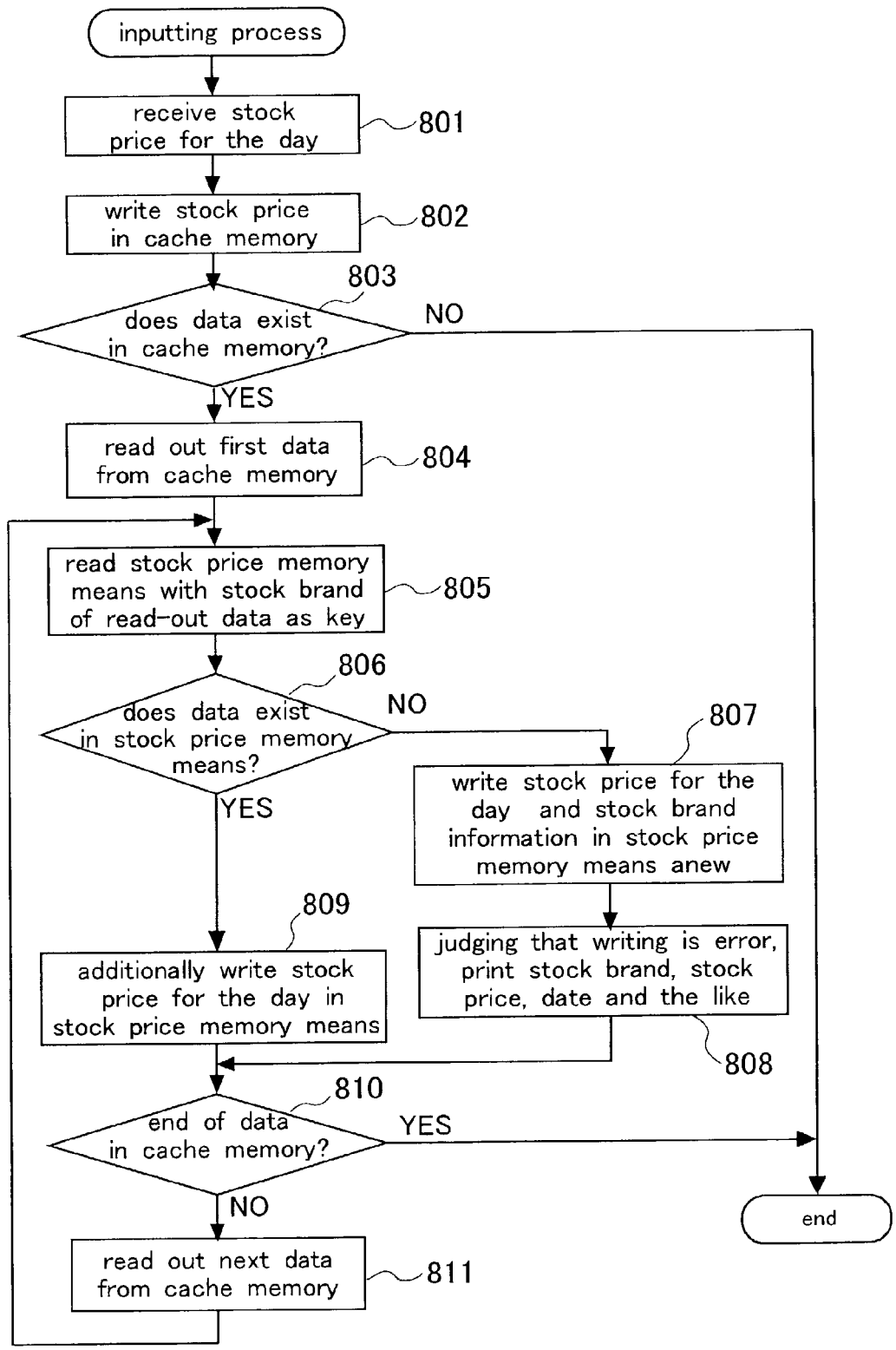
FIG. 8 is a flow chart showing details of stock price information inputting process.

Details of the inputting process are shown in the flow chart of FIG. 8. As shown in the figure, this inputting process includes process for periodically executing receipt of a stock price of the day and writing the stock price information in the cache memory 2c (steps 801 and 802), and process for reading out data concerning a stock brand specified in advance out of data written in the cache memory 2c on condition that the data is received (step 803; YES) to add the data to stock price data of the stock brand in the stock price memory means 4 (steps 804 to 811).

More specifically, in the stock price data adding process, first stock price information is read out from the cache memory 2c (step 804) and confirms if the corresponding stock brand information is stored in the stock price memory means 3 (steps 805 and 806). If the corresponding stock brand information is not stored in the stock price memory means 3 (step 806; NO), the stock price information is written in the stock price memory means 3 anew (step 807) and this stock brand information is outputted to a printer (step 808).

If it is judged in step 806 that the stock brand information corresponding to the stock price information is stored in the stock price memory means 3 (step 806; YES), a date, an opening price, a highest price, a lowest price, a closing price, comparison with the previous day and a trading volume are additionally written as shown in FIG. 2 with the stock price information as stock brand information of the day (step 809). Then, it is judged whether or not next stock price information is stored in the cache memory 2c (step 810). If a stock price information is not stored in the cache memory 2c (step 810; NO), the process is finished. If a stock price information is stored in the cache memory 2c (step 810; YES), the next stock price information is read out from the cache memory 2c (step 811) and the process is shifted to the process shown in steps 804 to 810 again.

Figure 9:
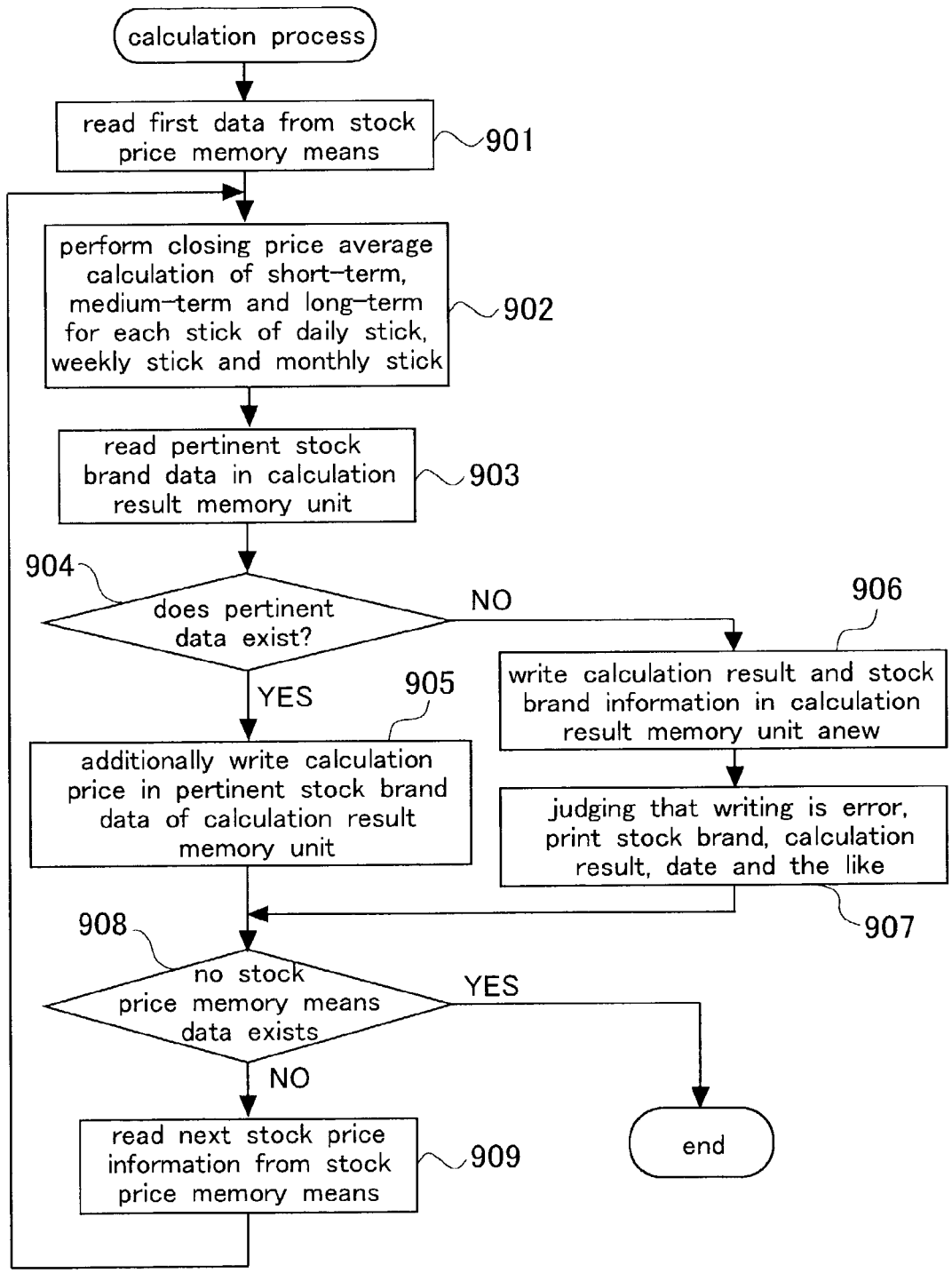
FIG. 9 is a flow chart showing details of calculation process.

Details of the calculation process are shown in the flow chart of FIG. 9. In the calculation process, first, stock price information (closing price) of a first stock is read out from the stock price memory means 4 in which stock price information is stored (step 901). Based on the read out stock price information, daily stick data, weekly stick data, monthly stick data, a short-term average closing price, a medium-term average closing price and a long-term average closing price for the present evaluation period are calculated, as described before (step 902). Subsequently, the calculation result memory means 6 is read (step 903) to confirm whether or not past stick data (see FIG. 2) of the pertinent stock brand is stored in the calculation result memory means 6 (step 904). If as a result of the confirmation, the stick data of the pertinent stock brand is stored in the calculation result memory means 6 (step 904; YES), the stick data is additionally written anew (step 907). On the other hand, if as a result of the confirmation, no past stick data of the pertinent stock brand is stored, the stick data is written in the daily stick memory unit 6a anew as an error (step 906) and, at the same time, this stick data is printed out to the printer device 7a (step 907).

Subsequently, it is judged whether or not all the stock price information of the stock price memory means 4 has been read out (step 908) and, if the readout of all the stock price information has not been finished (step 908; NO), stock price information of the next stock brand is read out (step 909) and the processing is shifted to that shown in steps 902 to 908 again. Further, if it is judged in step 908 that the readout of all the stock price information has been finished (step 908; YES), the process is finished.

Figure 10:
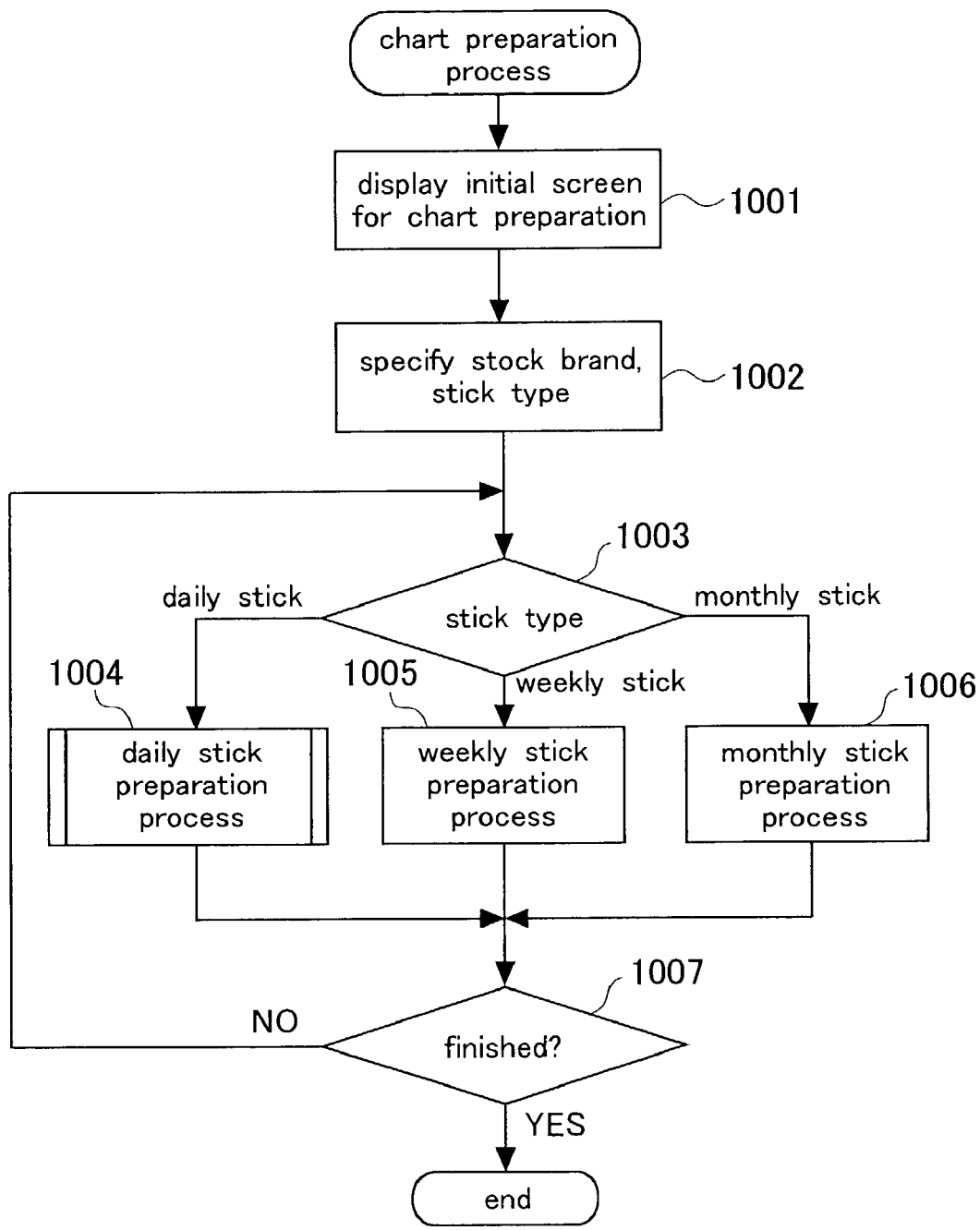
FIG. 10 is a flow chart showing details of chart preparation process.

Details of the chart preparation process are shown in the flow chart of FIG. 10. As shown in the figure, in the chart preparation process, a predetermined initial screen for chart preparation is displayed on the display device 7a (step 1001) and then a stock brand name (based on stock brand code input or the like) and a stick type (a daily stick, a weekly stick or a monthly stick) that a user desires to display are specified according to the user's instruction inputted via this screen (step 1002).

Figure 14:
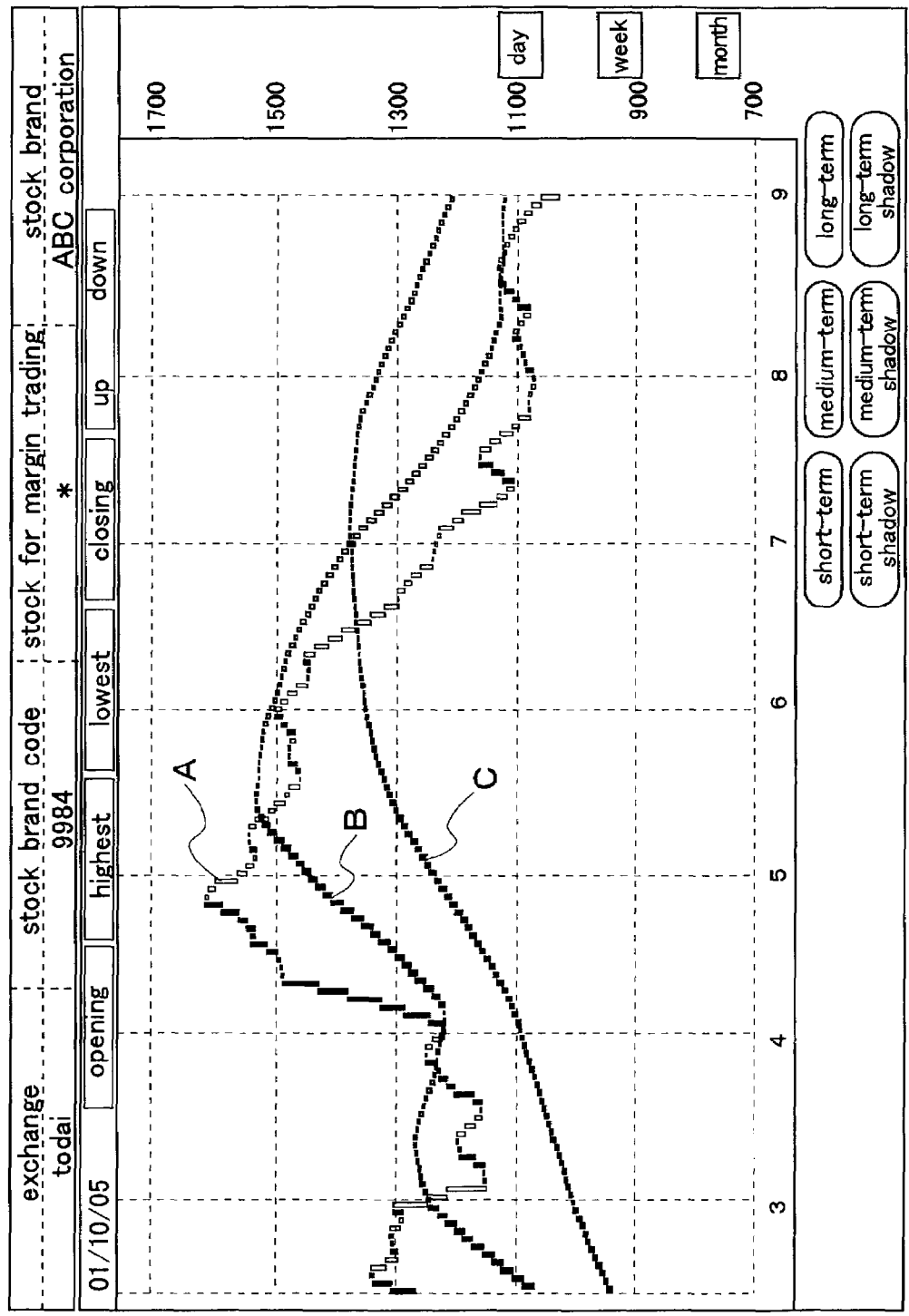
FIG. 14 is an example of a stock price chart in which usual short-term line, medium-term line and long-term line are simultaneously displayed.

FIG. 14 shows an example of a stock price chart preparation screen that is displayed on the display device 7a in preparing a stock price chart. Further, although the figure shows three types of moving lines (a short-term line A, a medium-term line B and a long-term line C) using a Masuda stick (daily stick) displayed simultaneously, these moving lines are not displayed on the above-described initial screen display yet.

On the chart preparation initial screen, coordinate axes with the vertical axis as a price axis and the horizontal axis as a time axis (in this example, months indicating the dates are shown) are displayed. In addition, in the upper part of the screen, an exchange, a stock code, a margin trading stock code, a stock brand name, a designated date (chart preparation day or the like), an opening price, a highest price, a lowest price, a closing price and the like are displayed.

In the chart preparation process, a stock brand is specified by inputting a stock brand code, for which a user desires preparation of a chart, in a predetermined column indicated by an indication "stock brand code" in the upper part on the chart preparation initial screen. In addition, in the chart preparation process, a stick type is specified by a user operating a mouse to appropriately select an icon (in a form in which each word of 'day', 'week' and 'month' surrounded by a square) for specifying a daily stick, a weekly stick and a monthly stick that are displayed on the right side on the chart preparation initial screen.

Referring to the flow chart of FIG. 10 again, daily stick preparation process (step 1004), weekly stick preparation process (step 1005) and monthly stick preparation process (step 1006) are performed if a daily stick, a weekly stick and a monthly stick are selected (specified) in step 1002, respectively. Further, each stick preparation process is repeatedly performed until a predetermined finishing operation is applied (step 1007; YES).

Details of the "daily stick preparation process" will be described hereinafter. However, details of the "weekly stick preparation process" and the "monthly stick preparation process" will not be described here since those skilled in the art would easily understand the contents of the process with reference to the "weekly stick" and the "monthly stick" already described or the following detailed description of the daily stick preparation process.

Figure 11:
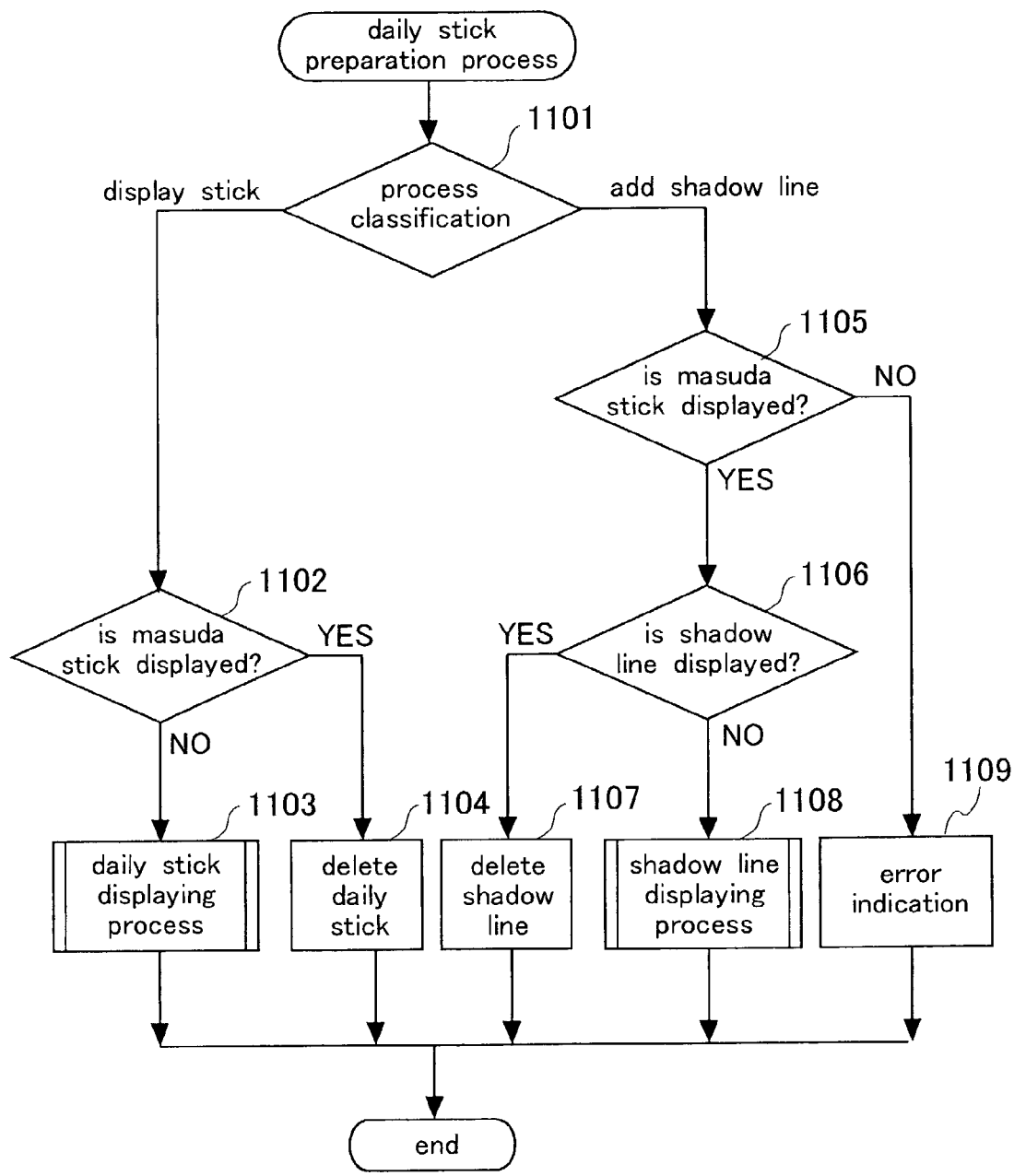
FIG. 11 is a flow chart showing details of daily stick preparation process.

Details of the daily stick preparation process are shown in FIG. 11. As shown in the figure, the daily stick preparation process is divided into a process for displaying a moving line that is based on a Masuda stick, and process for displaying a moving line by a Masuda shadow stick by further adding shadow lines to a displayed Masuda stick. The process is specified based on selection of a user.

The selection of a user is performed via the stock price chart preparation screen shown in FIG. 14. In the figure, indications 'short-term stick', 'medium-term stick', 'long-term stick', 'short-term shadow', 'medium-term shadow' and 'long-term shadow' surrounded by a frame in the lower right part in the figure indicate icons for specifying the classification of each process. As in the specification of a stick type, the classification of the process is specified by selecting the icon on the chart preparation screen via mouse operation of a user.

Then, on the screen, when any one of 'short-term stick', 'medium-term stick' and 'long-term stick' is selected (step 1101; 'display a stick'), process for displaying (or 'erasing' if already displayed) a pertinent moving line using a Masuda stick on (from) the screen anew is performed.

That is, in step 1102, first, confirmation whether or not a moving line based on the selected Masuda stick is already being displayed on the chart, is performed. Here, if the pertinent moving line is not displayed yet (step 1102; NO), display process of the moving line is performed (step 1103). On the other hand, if it is judged in step 1102 that the pertinent moving line is displayed (step 1102; YES), the moving line is 'erased' from the screen in this example. As it is seen from this, in this embodiment, a short-term line, a medium-term line and a long-term line can be displayed in an arbitrary combination for each type of a daily stick, a weekly stick and a monthly stick.

In addition, when any one of 'short-term shadow', 'medium-term shadow' and 'long-term shadow' is selected on the chart preparation screen in step 1101 (step 1101; 'add a shadow'), process for additionally displaying (or 'erasing' if already displayed) shadow lines on (from) a Masuda stick forming a pertinent displayed moving line associated by "short-term", "medium-term" and "long-term" is performed.

That is, in step 1105, first, it is confirmed whether or not a pertinent Masuda stick is already displayed on the screen (step 1105). Here, if it is judged that the pertinent Masuda stick is not displayed (step 1105; NO), error indication (e.g., indication that "a Masuda stick is not displayed.") is displayed (step 1109), and the process is once finished.

When it is judged in step 1105 that display of the pertinent Masuda stick is confirmed (step 1105; YES), it is subsequently judged whether or not shadow lines are already added to the Masuda stick (step 1106). Here, if shadow lines are not added yet (step 1106; NO), shadow line display process shown in step 1109 is performed. On the other hand, if it is judged in step 1107 that a shadow lines are already added to the pertinent Masuda stick (step 1107; YES), the shadow lines are 'erased' from the Masuda stick (a Masuda shadow stick in this case) in this example. As it is seen from this, shadow lines can be additionally displayed or erased for each short-term line, medium-term line and long-term line in this embodiment.

Figure 12:
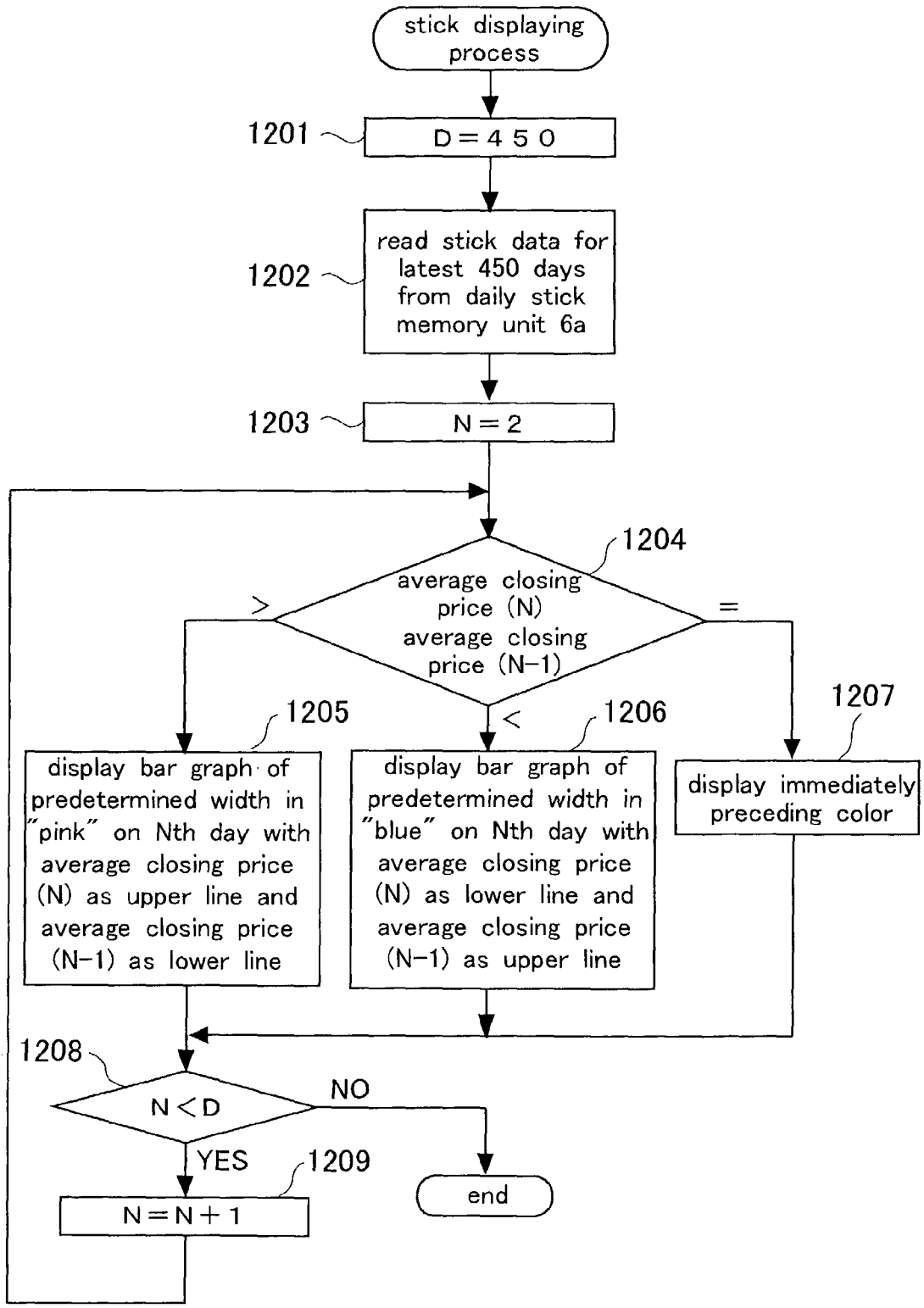
FIG. 12 is a flow chart showing details of stick displaying process.

Details of the daily stick displaying process shown in step 1103 in FIG. 11 are shown in the flow chart of FIG. 12.

As described above, daily stick data of the latest 450 days is used for preparation of a daily stick. That is, in the daily stick displaying process, first, '450' which is '1' less than the preparation number of sticks, is set in a comparison price D (step 1201). Further, since this example is a "daily stick", D is set to 450, however, in the case of a weekly stick, D is set to '192' and, in the case of a monthly stick, D is set to '176'.

Subsequently, stick data of the latest 450 days is read from the daily stick memory unit 6a (step 1202), and '2' is set in the counter N. This counter N is an index value for specifying the read out stick data from the oldest one in order. Further, an initial value of the counter N is set to '2' because two average closing prices, of the present evaluation period and of the previous evaluation period, are required for preparation of a Masuda stick.

That is, in step 1204, an Nth average closing price of the read out daily stick data (an average closing price of the present evaluation period) and an (N−1)th average closing price (an average closing price for the previous evaluation period) are compared (step 1204).

Here, if the Nth average closing price is larger than the (N−1)th average closing price, a pink Masuda stick with the average closing price (N) as an upper line and the average closing price (N−1) as a lower line is displayed on pertinent coordinates based on date data specified by the counter N (step 1205).

On the other hand, if the Nth average closing price is smaller than the (N−1)th average closing price, a blue Masuda stick with the average closing price (N) as a lower line and the average closing price (N−1) as an upper line is displayed on pertinent coordinates based on date data specified by the counter N (step 1206).

In addition, if the Nth average closing price and the (N−1)th average closing price are the same, a horizontal bar of the color identical with the immediately preceding stick is displayed on pertinent coordinates based on date data specified by the counter N (step 1207).

Next, it is judged whether or not N is smaller than D (step 1208) and, if N is smaller than D, N is counted up by one (step 1209) and the process returns to step 1204. Further, the process is repeatedly performed until the counter N equals D (step 1208; NO).

Figure 13:
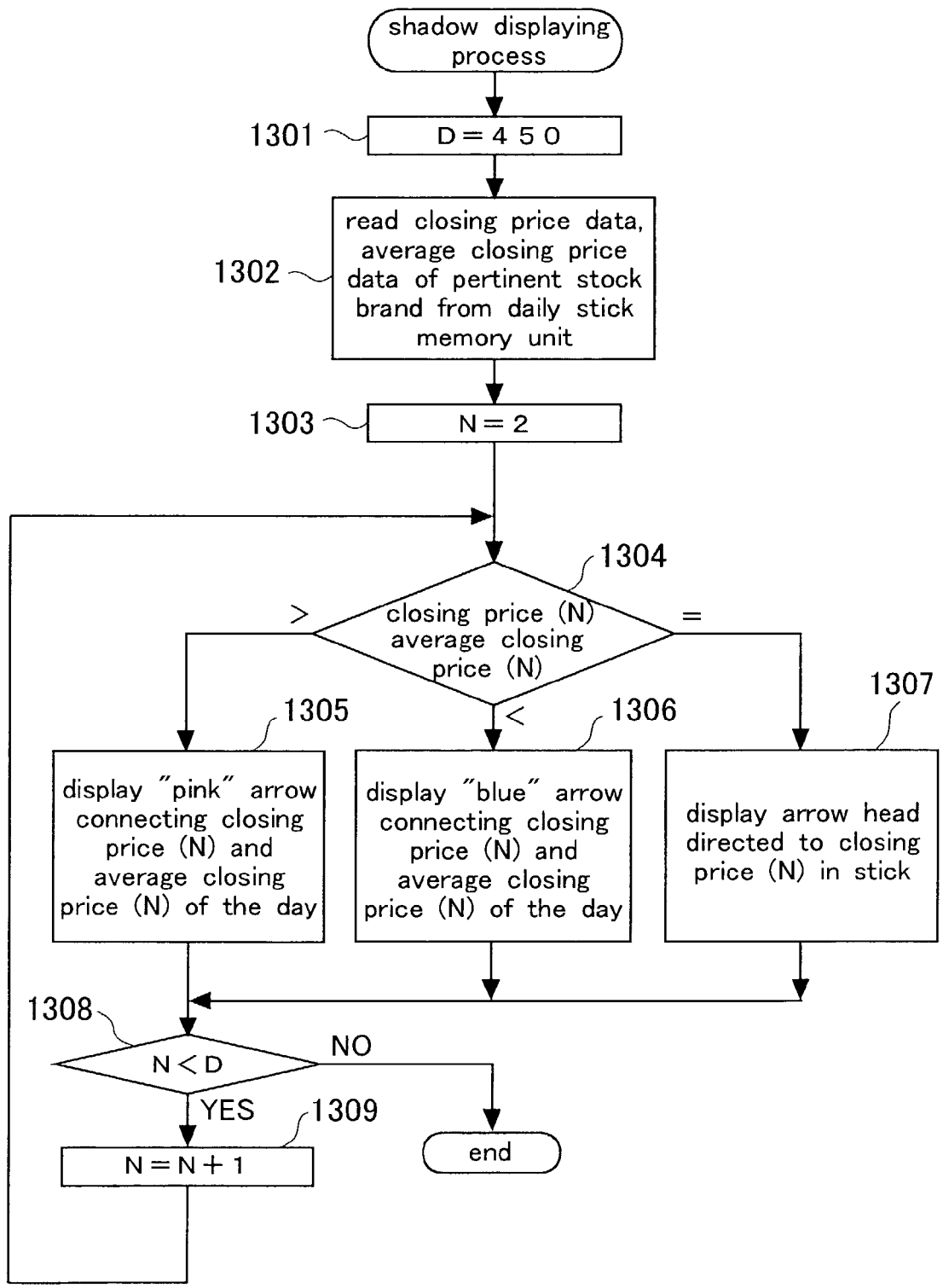
FIG. 13 is a flow chart showing details of shadow displaying process.

Details of the shadow line displaying process shown in step 1108 in FIG. 11 are shown in the flow chart of FIG. 13.

Further, in this example, the shadow line displaying process is performed on the premise that a Masuda stick is already displayed. However, in order to facilitate understanding, the process will be described assuming that daily stick data is read from the memory unit 6a again.

That is, in the shadow line displaying process, first, '450' that is '1' less than the preparation number of shadow line sticks is set in a comparison price D (step 1301). Further, since this example is a "daily stick", D is set to 450. However, in the case of a weekly stick, D is set to '192' and, in the case of a monthly stick, D is set to '176'.

Subsequently, stick data (including closing price data) of the latest 450 days is read from the daily stick memory unit 6a (step 1302), and '2' is set in the counter N.

That is, in step 1304, an Nth closing price of the read out daily stick data (a closing price of the present evaluation period) and an Nth average closing price (an average closing price of the present evaluation period) are compared (step 1304).

Here, if the Nth closing price (closing price of the day) is larger than the Nth average closing price (average closing price of the day), a pink arrow line connecting the Nth closing price and the Nth average closing price is additionally displayed on a Masuda stick on the coordinates (step 1305) as shown in FIG. 6.

On the other hand, if the Nth closing price (closing price of the day) is smaller than the Nth average closing price (average closing price of the day), a blue arrow line connecting the Nth closing price and the Nth average closing price is additionally displayed on a Masuda stick on the coordinates (step 1306).

In addition, if the Nth closing price and the Nth average closing price are the same, an arrow head is displayed in a Masuda stick with its tip positioned in an average closing price of the present evaluation period (=a closing price of the present evaluation period) (step 1307).

Next, it is judged whether or not N is smaller than D (step 1308) and, if N is smaller than D, N is counted up by one (step 1309) and the process is returned to step 1304. Further, the process is repeatedly performed until the counter N equals D (step 1308; NO).

FIG. 14 shows a stock price chart in the case in which a short-term line A of a daily stick, a medium-term line B of a daily stick and a long-term line C of a daily stick, which are prepared through the stick displaying process shown in FIG. 12, are simultaneously displayed. Further, although not clear since the figure is drawn in black and white, Masuda sticks colored in black indicates 'pink', and Masuda sticks colored in white indicates 'blue' (this is assumed to be the same in FIGS. 15 to 22).

As shown in the figure, in all moving lines (a short-term line, a medium-term line and a long-term line) by a Masuda stick, continuity is secured among adjacent Masuda sticks. Thus, the moving lines are drawn as unbroken, and extremely smooth curves, whereas a curve according to a candlestick tends to be broken. Consequently, even a beginner in stock trading can easily read the moving lines and can easily grasp a stock price trend. In addition, since a stock price trend (rise and fall) in each day is indicated with two colors, pink and blue, a user can intuitionally find a trend in a stock price not only by vertical fluctuation of moving lines but also by colors.

Figure 15:
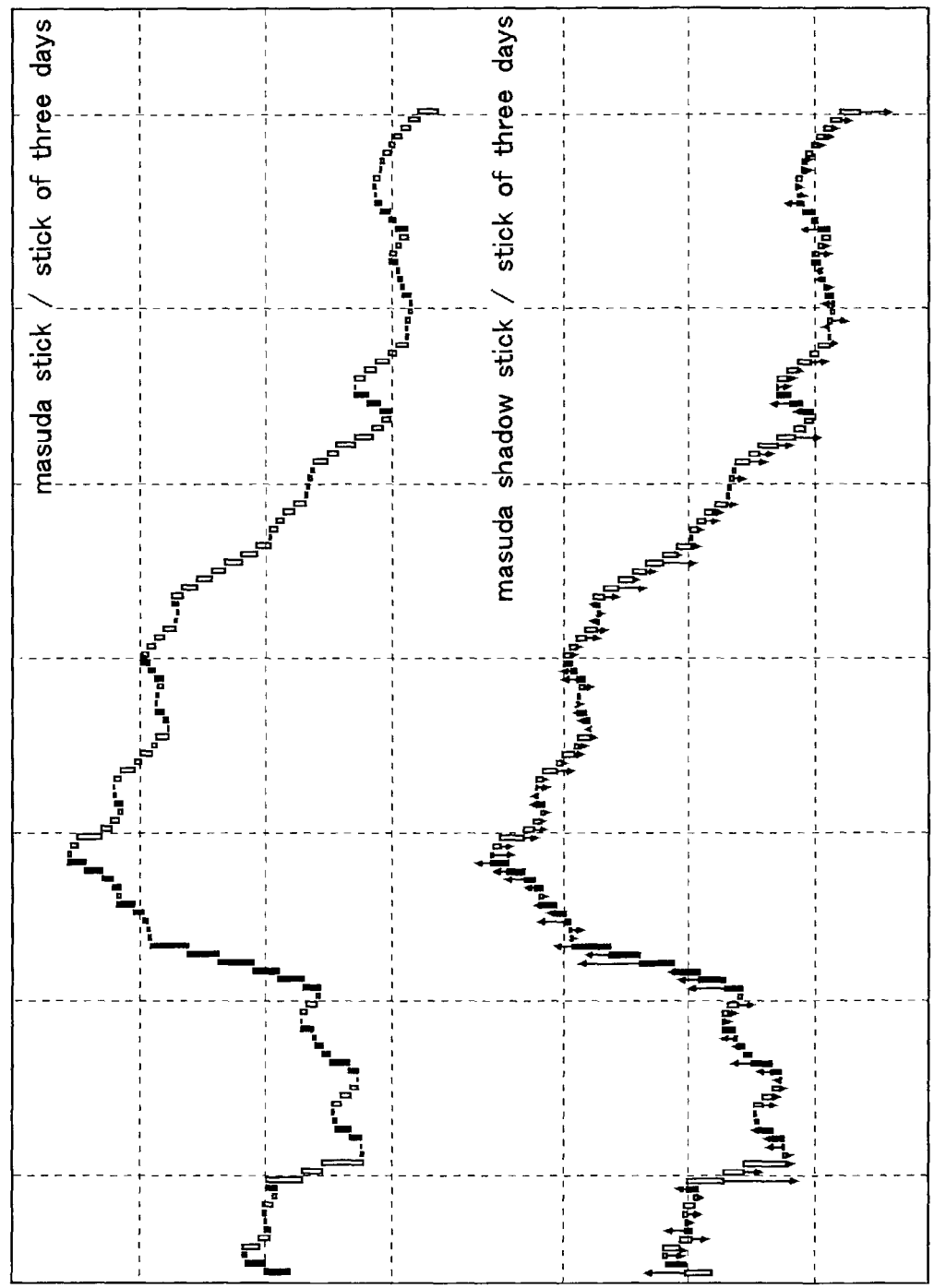
FIG. 15 is a graph showing daily stick short-term line using an ordinary Masuda stick and daily stick short-term line using a Masuda shadow stick in comparison with each other.

FIG. 15 is a graph showing a short-term line using a Masuda shadow stick that is prepared through the shadow stick displaying process shown in FIG. 13 (a stock price chart using a Masuda shadow stick of three days). Further, in the figure, a short-term line of a daily stick according to an ordinary Masuda stick (without shadow lines) (upper one) and a short-term line of a daily stick using a Masuda shadow stick (lower one) are simultaneously shown in order to clearly indicate a difference between them. Further, although unclear since the figure is drawn in black and white, an upward shadow line (arrow line) is colored in pink and a downward shadow line (arrow line) is colored in blue in the figure (this is assumed to be the same in FIGS. 16 to 22).

In particular, a short-term line by a Masuda shadow stick is preferably used for finding a changing point to a rising trend or a falling trend of a stock price earlier and with a high probability.

Figure 16:
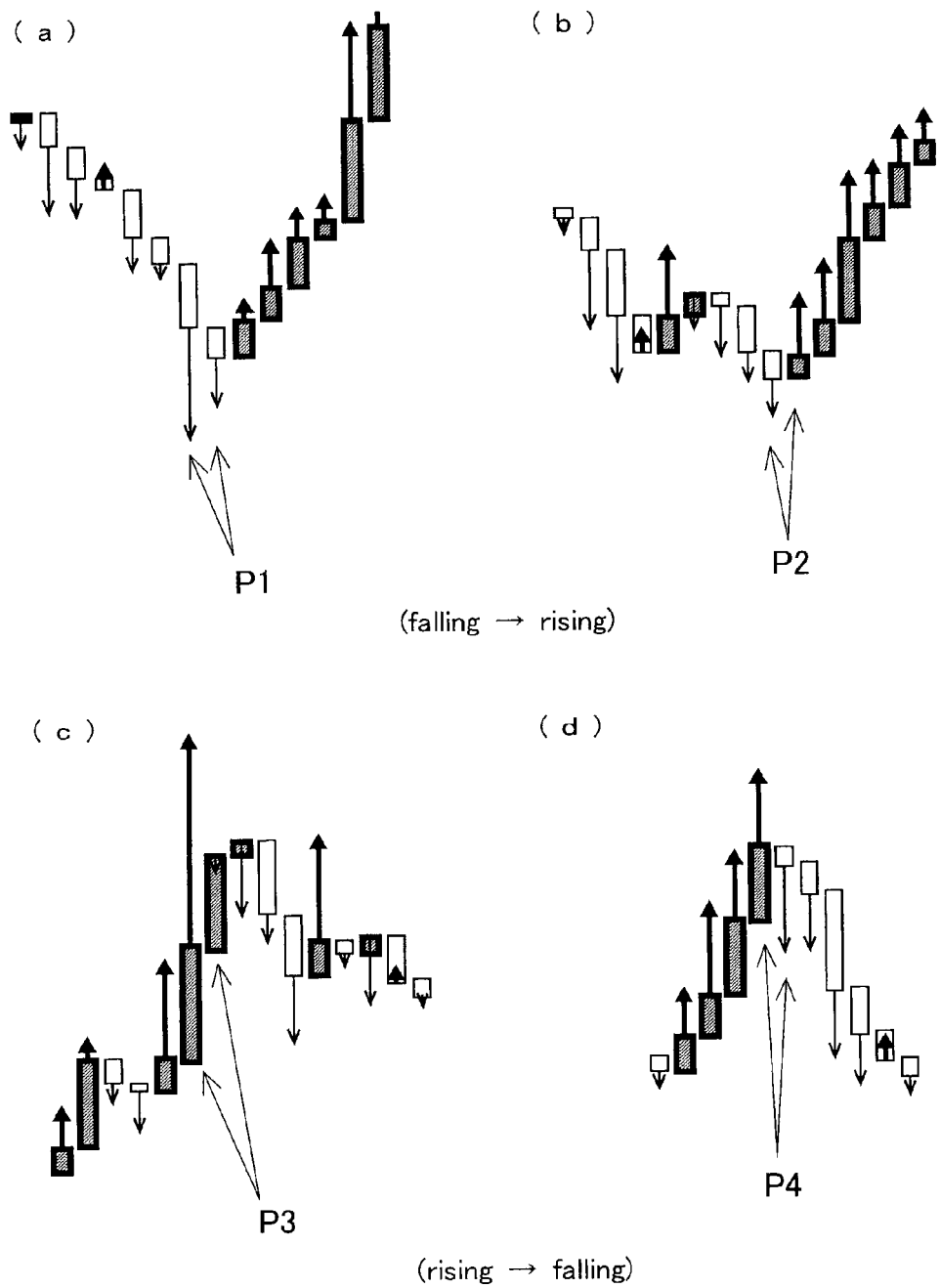
FIGS. 16A to 16D are graphs for explaining a method of forecasting a trend of stock price using a Masuda shadow stick of three days.

FIG. 16 is a graph for describing an "changing point estimation method" according to such a short-term line (a Masuda shadow stick of three days in this example) while showing a specific example of a Masuda shadow stick.

In this embodiment, as shown by P1 in (a) and by P2 in (b) in the figure, a point where a stock price trend changes from a falling trend to a rising trend is estimated by specifying P1 and P2.

The point P1 shown in (a) in the figure is in the falling trend and indicates a state in which a Masuda shadow stick for the present evaluation period is included in an entire length region (vertical region indicated by two broken lines in the figure) of a Masuda shadow stick for the previous evaluation period on the coordinates. In this case, it is estimated that fluctuation in a stock price will change from the falling trend to the rising trend the next day and thereafter.

The point P2 shown in (b) in the figure indicates a state in which a color of a Masuda stick for the previous evaluation period on the coordinates is 'blue', a Masuda stick for the present evaluation period is 'pink', a color of a shadow line for the previous evaluation period is 'blue' and a color of a shadow line for the present evaluation period is 'pink'. In this case, it is estimated that fluctuation of a stock price will change from the falling trend to the rising trend from the present evaluation period and thereafter.

On the other hand, as shown by P3 in (c) and by P4 in (d) in the figure, a point where a stock price changes from the rising trend to the falling trend is estimated by specifying P3 and P4.

The point P3 shown in (c) in the figure is in the rising trend and indicates a state in which a Masuda shadow stick for the present evaluation period is included in an entire length region (vertical region indicated by two broken lines in the figure) of a Masuda shadow stick for the previous evaluation period on the coordinates. In this case, it is estimated that fluctuation of a stock price will change from the rising trend to the falling trend from the next day and thereafter.

The point P4 shown in (d) in the figure indicates a state in which a color of a Masuda stick for the previous evaluation period on the coordinates is 'pink', a Masuda stick for the present evaluation period is 'blue', a color of a shadow line for the previous evaluation period is 'pink' and a color of a shadow line for the present evaluation period is 'blue'. In this case, it is estimated that fluctuation of a stock price will change from the rising trend to the falling trend from the day and thereafter.

Further, the above-described method of estimating a changing point is discovered as a result of earnest study of the applicant. According to this method, an extremely high ratio for a method of estimating a trend in a stock price was obtained. Note that, although this example is for a daily stick, the similarly high ratio of correct estimation was obtained for a weekly stick and a monthly stick as well.

Figure 17:
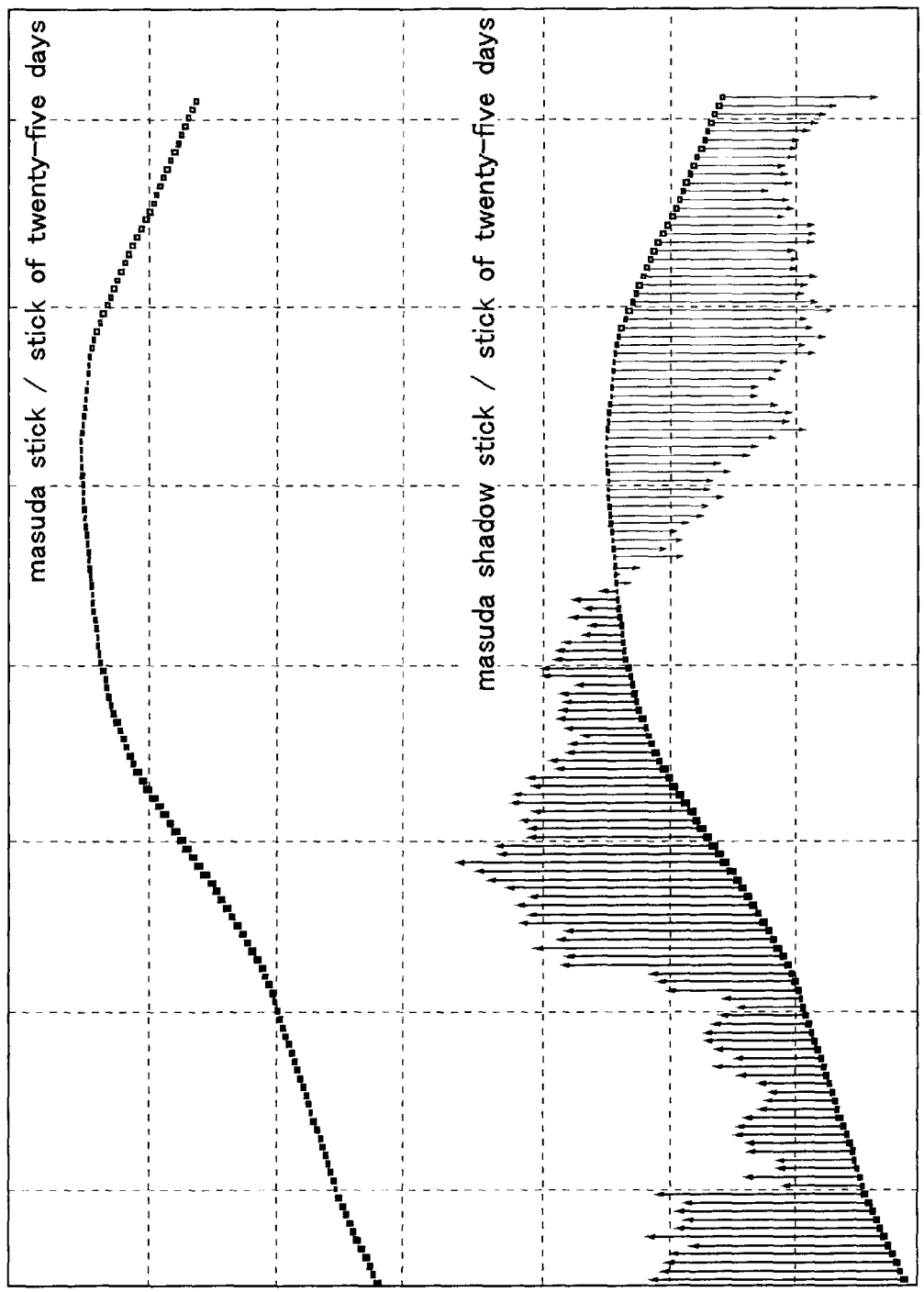
FIG. 17 is a graph showing daily stick medium-term line using an ordinary Masuda stick daily stick medium-term line using a Masuda shadow stick in comparison with each other.

FIG. 17 is a graph showing a medium-term line by a Masuda shadow stick that is prepared through the shadow stick displaying process shown in FIG. 13 (a stock price chart by a Masuda shadow stick of twenty-five days). Further, in the figure, a medium-term line of a daily stick according to an ordinary Masuda stick (without shadow lines) (upper one) and a medium-term line of a daily stick by a Masuda shadow stick (lower one) are simultaneously shown in order to clearly indicate a difference between them.

A medium-term line by a Masuda shadow stick is regarded as mainly preferable for estimation of a trend in a stock price based on a medium-term point of view.

A medium-term line by a Masuda Method of stick body draws a gentler curve compared with a short-term line. Thus, as shown in the figure, a plurality of same color shadow lines extending from the Masuda Method of stick are often continued in a sequence in a direction of the time axis and easily form a visual pseudo surface (same color shadow line region) compared with the case of a short-term line. In addition, this shadow line region has a bump appearing in its central part and convergent points appearing at its both ends and is often drawn as a same color shadow line region of substantially a shape of the comb teeth extending in a direction of a time axis.

That is, bearing in mind the formation of such a same color shadow line region, it becomes possible for a user to accurately estimate the convergent point, that is, a point of change in a trend of a stock price at one glance from a medium-term point of view. Further, it is confirmed that, in this shadow line region having the same color, a total of blue shadow line region and a total of pink shadow line region, both have substantially the same area if observed over a long period. This should also be referred to significantly in making estimation.

Figure 18:
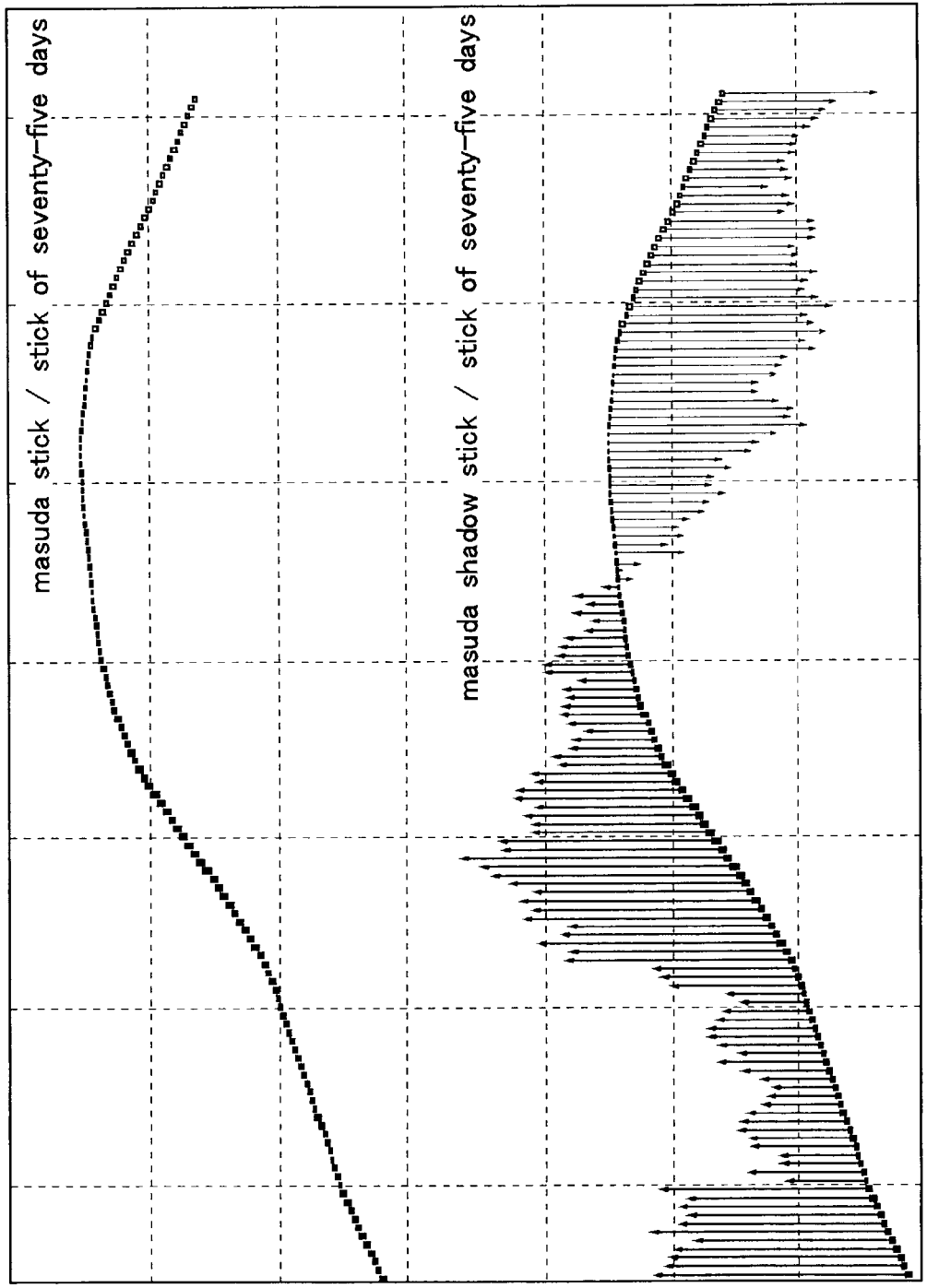
FIG. 18 is a graph showing daily stick long-term line using an ordinary Masuda stick and daily stick long-term line using a Masuda shadow stick in comparison with each other.

FIG. 18 is a graph showing a long-term line by a Masuda shadow stick that is prepared through the shadow stick displaying process shown in FIG. 13 (a stock price chart by a Masuda shadow stick of seventy-five days). Further, in the figure, a long-term line of a daily stick according to an ordinary Masuda stick (without shadow lines) (upper one) and a long-term line of a daily stick by a Masuda shadow stick (lower one) are simultaneously shown in order to clearly indicate a difference between them.

A long-term line by a Masuda shadow stick is regarded as mainly preferable for estimation of a trend in a stock price based on a long-term point of view.

A long-term moving by a Masuda stick draws a much gentler curve than a medium-term line. Thus, as shown in the figure, a plurality of shadow lines having the same color extending from the Masuda stick are continued in a sequence in a direction of a time axis, whereby a visual pseudo surface (shadow line region having the same color), which is larger and clearer than that of a medium-term line, is easily formed. In addition, this shadow line region has a bump appearing in its central part and convergent points appearing at its both ends similar to the medium-term line and is often drawn as a shadow line region having the same color of substantially a shape of the teeth of a comb extending in a direction of a time axis. That is, bearing in mind the formation of such a shadow line region having the same color, it becomes possible for a user to accurately estimate the convergent point, that is, a point of change in a trend of a stock price at one glance from a long-term point of view. Further, similarly, it is confirmed that, in this shadow line region having the same color, a total of blue shadow region and a total of pink shadow region also have substantially the same area in the long-term line. This should also be referred to significantly in making estimation.

Figure 19:
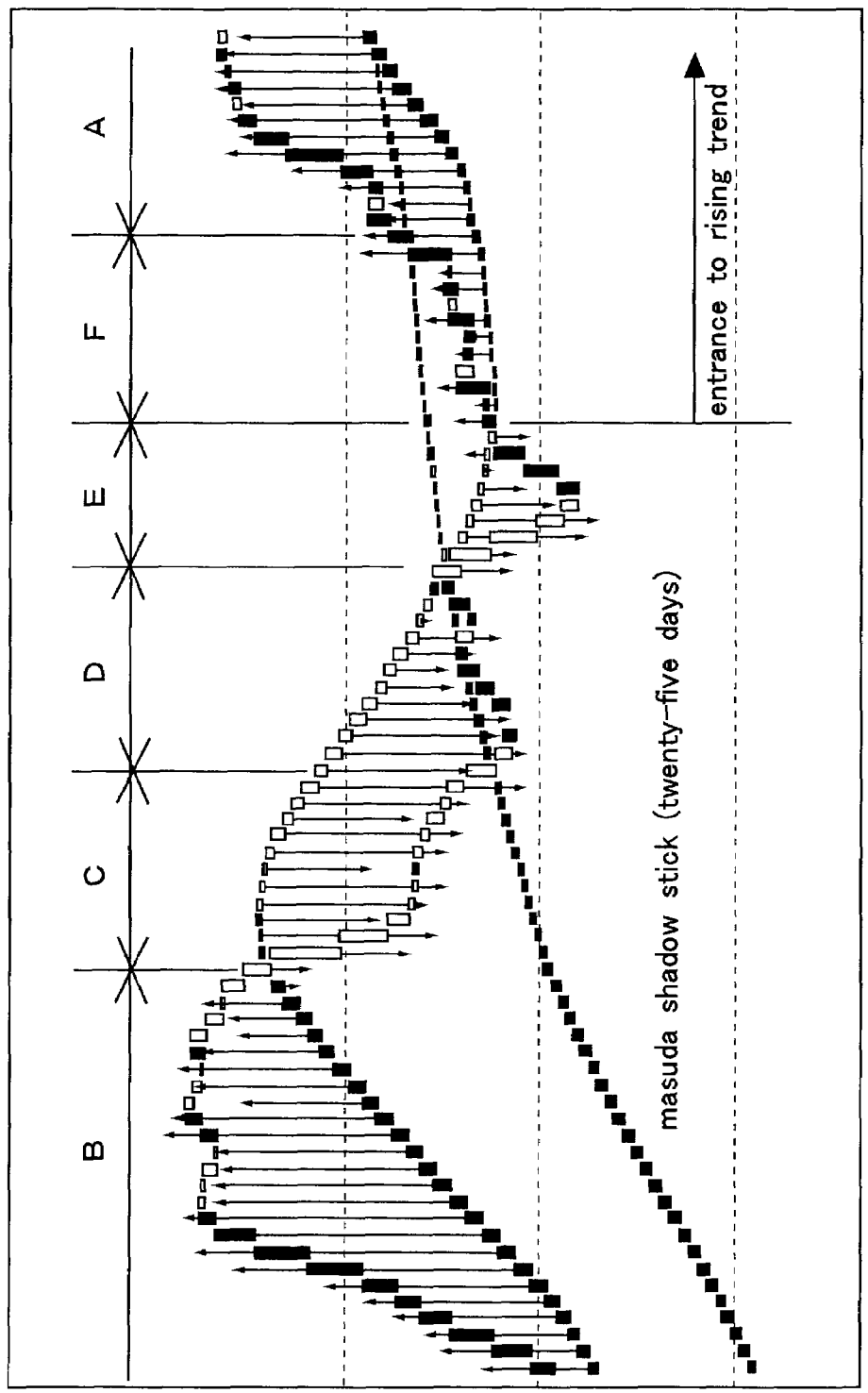
FIG. 19 is an example of a stock price chart in which daily stick short-term line of and daily stick long-term line using an ordinary Masuda stick and daily stick medium-term lines using a Masuda shadow stick are simultaneously displayed.

Next, FIG. 19 is a graph showing an example (partly enlarged graph) of a stock price chart in which shadow lines are additionally displayed on (each Masuda stick of) a medium-term line (i.e., a medium-term line is turned into a Masuda shadow stick) through the shadow stick displaying process shown in FIG. 13 among a short-term line, a medium-term line and a long-term line (all of which are daily sticks) that are prepared through the stick displaying process shown in FIG. 12.

Figure 20:
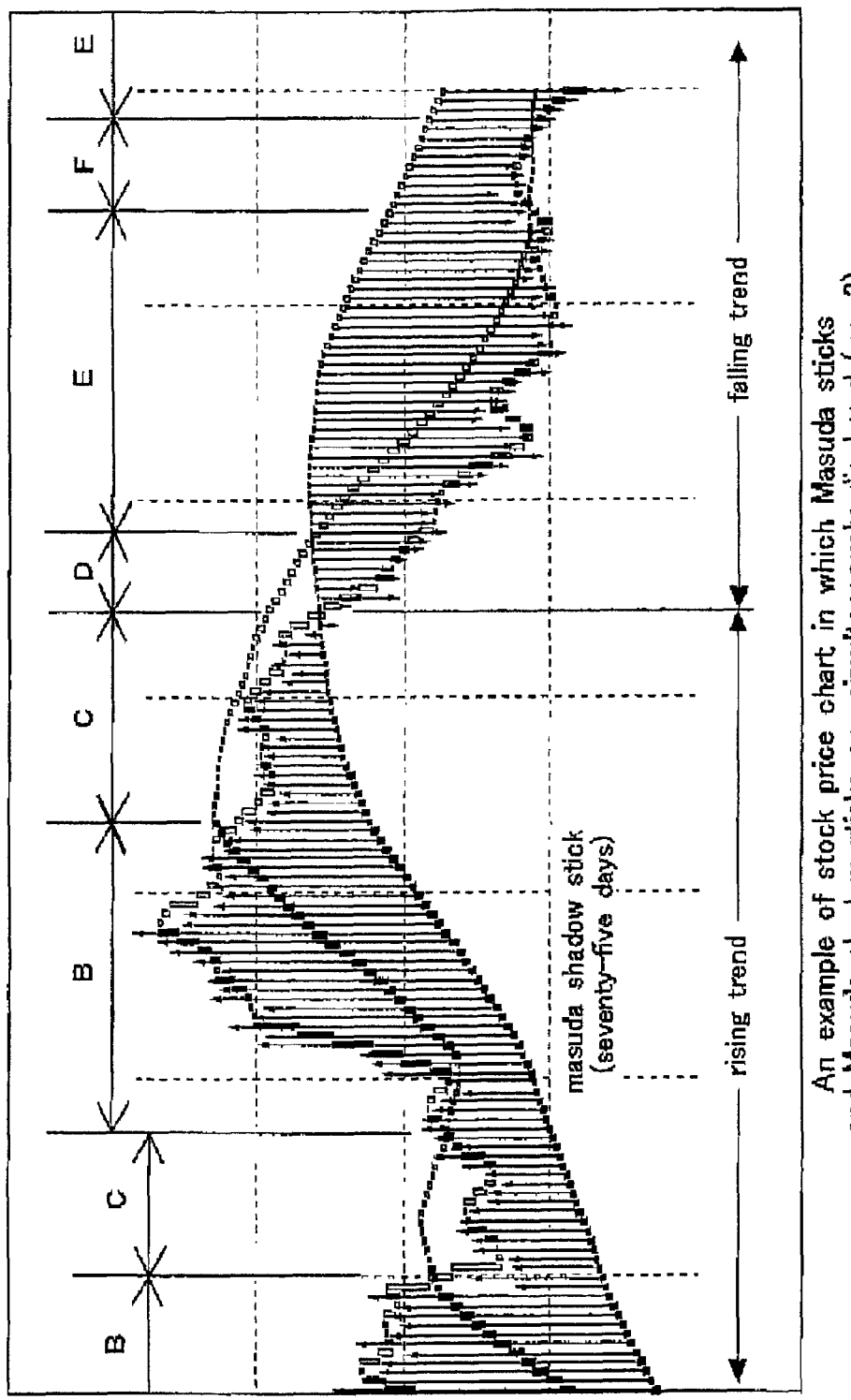
FIG. 20 is an example of a stock price chart in which daily stick short-term line and daily stick medium-term line using an ordinary Masuda stick and daily stick long-term line using a Masuda shadow stick are simultaneously displayed.

In addition, FIG. 20 is a graph showing an example (partly enlarged graph) of a stock price chart in which shadow lines are additionally displayed on (each Masuda stick of) a long-term line (i.e., a long-term line is turned into a Masuda shadow stick) through the shadow stick displaying process shown in FIG. 13 among a short-term line, a medium-term line and a long-term line (all of which are daily sticks) that are prepared through the stick displaying process shown in FIG. 12.

As shown in FIGS. 19 and 20, in this example, a Masuda stick for drawing a short-term line is a Masuda stick based on an average closing price of three days including the present evaluation period (Masuda stick of three days), a coordinate point of each closing price generally concentrates around the Masuda stick of three days. That is, as a result, as shown in FIG. 19, if shadow sticks are additionally displayed on the medium-term line, a shadow line region having the same color formed by the display turns into a shadow line region having the same color of substantially the same area and same shape as a region on the coordinates surrounded by the short-term line and the medium-term line.

Similarly, as shown in FIG. 20, if shadow sticks are additionally displayed on the long-term line, a shadow line region having the same color by the display turns into a shadow line region having the same color of substantially the same area and same shape as a region on the coordinates surrounded by the short-term line and the long-term line.

Then, as shown in FIGS. 19 and 20, all of the short-term line, the medium-term line and the long-term line are simultaneously displayed and, at the same time, a region on the coordinates surrounded by the short-term line and the medium-term line, or the short-term line and the long-term line is displayed by shadow lines. In so doing, a convergent point by the shadow line region becomes distinct (i.e., a crossing point of moving lines, as a result becomes distinct). In addition, as indicated by symbols 'A' to 'F' in FIGS. 19 and 20, it becomes possible to distinguish an appearance pattern (trend pattern) of each moving line at one glance. Further, the points at which a stock brand to be bought, a stock brand to be sold and clearance can be easily specified by distinguishing the patterns 'A' to 'F'.

Here, in this embodiment, each pattern shown in A to F in the figure is classified into the following six types according to a sequential order of a short-term line, a long-term line and a medium-term line (these are common to all of a daily stick, a weekly stick and a monthly stick). Note that the sequential order is from the highest one.

Pattern A: (short-term→long-term→medium-term): entrance to a rising trend
Pattern B: (short-term→medium-term→long-term): rising trend
Pattern C: (medium-term→short-term→long-term): collapse of a rising trend
Pattern D: (medium-term→long-term→short-term): entrance to a falling trend
Pattern E: (long-term→medium-term→short-term): falling trend
Pattern F: (long-term→short-term→medium-term): end of a falling trend Then, it is understood that the entire stock price is circulating as A→B→C→D→E→F→A . . . , and by specifying which pattern applies to the stock price at each point of time, the points of a stock brand to be bought, a stock brand to be sold and clearance are specified appropriately.

Figure 21:
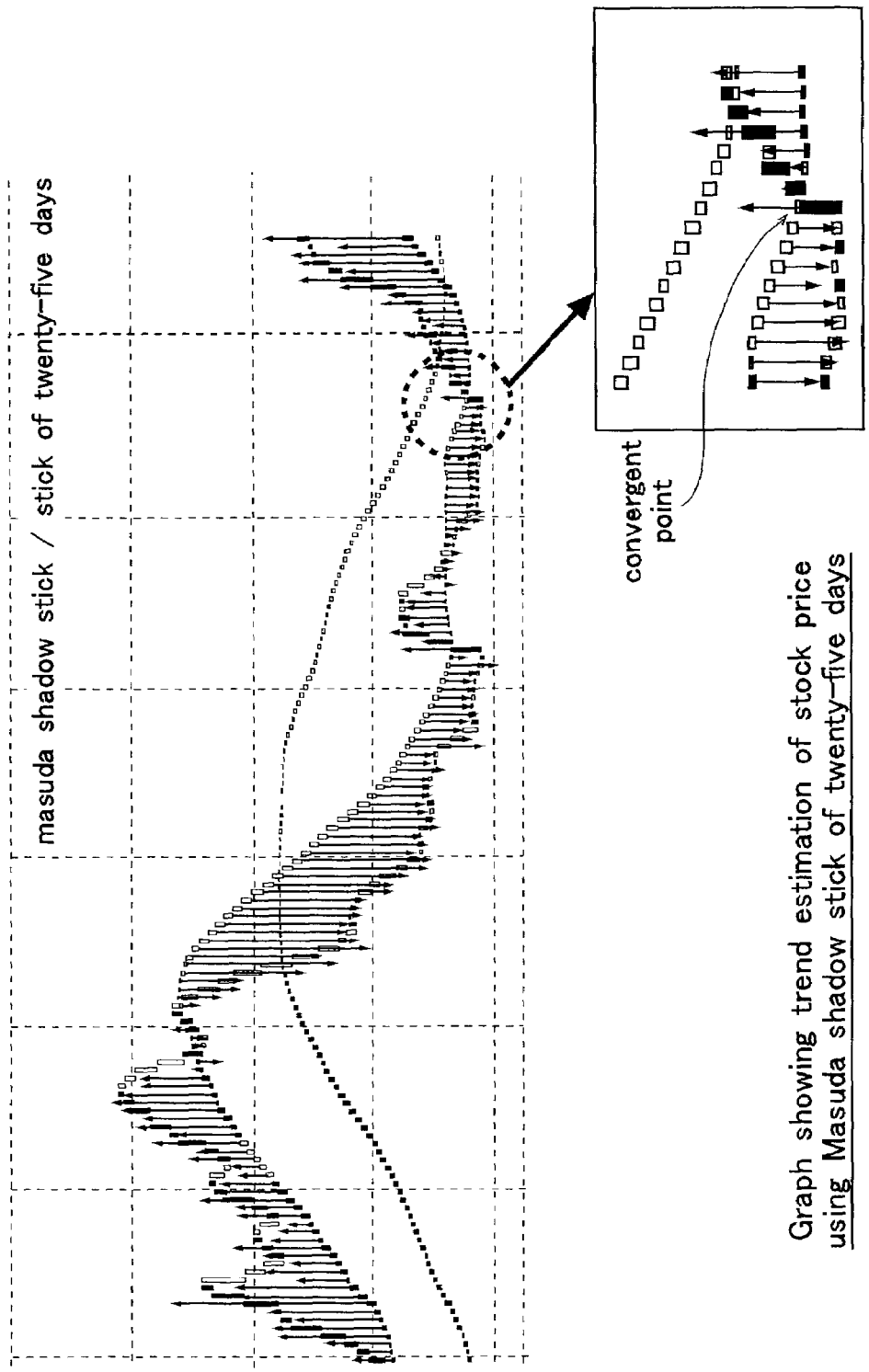
FIG. 21 is a graph showing a method of forecasting a stock price trend using medium-term lines using Masuda shadow stick.

Next, in this embodiment, a point of change in a trend of a stock price can also be estimated in advance by a medium-term line using Masuda stick. An example of a form for such estimation is shown in FIG. 21. Further, the figure shows a stock price chart in which a short-term line and a long-term line of an ordinary Masuda stick and a medium-term line using Masuda shadow stick are simultaneously drawn.

Further, in a frame located in the lower right of the figure, a region around a crossing point (convergent point) of a short-term line by a Masuda stick and a medium-term line by a Masuda shadow stick surrounded by a broken circle, is shown in enlargement.

As shown in the figure, if shadow line of a Masuda shadow stick in a crossing point (convergent point) of a medium-term line by a Masuda shadow stick and another line is largely reversed from the previous direction, it can be estimated in advance that a trend of a stock price thereafter changes in a direction in which it is reversed (from falling to rising in the example shown in the figure). More specifically, in the figure, it can be estimated that a trend pattern shifts from the pattern E to the pattern F as indicated by the circulation pattern described above.

Further, this method of estimation is also discovered as a result of earnest study of the applicant. According to this method, an extremely high ratio for a method of estimating a trend in a stock price was obtained. Note that, although this example is for a daily stick, the similarly high ratio of correct estimation was obtained for a weekly stick and a monthly stick as well. Moreover, the same principle can be applied to a long-term line according to each Masuda shadow stick of a daily stick, a weekly stick and a monthly stick. In this case, a similarly high ratio of correct estimation was obtained.

In addition, in this embodiment, change in a trend of a stock price can be estimated using a medium-term line by a Masuda shadow stick and a long-term line by a Masuda shadow stick. An example of a form for such estimation is shown in FIG. 22. Further, the figure shows a stock price chart in which a short-term line of an ordinary Masuda stick and a medium-term line and a long-term line by a Masuda shadow stick are simultaneously drawn.

As shown in the figure, in a range indicated by symbol A, a pink region of a medium-term line using Masuda shadow stick appears but most of the pink region is invaded by a blue region of a long-term line using Masuda shadow stick. Thus, it can be seen that a stock price has not entered a real rising trend yet. Therefore, it is estimated that a trend pattern shifts from the pattern E to the pattern F once but returns to the pattern E again at that point. On the other hand, in a range indicated by symbol B, a blue region of a long-term line of a Masuda shadow stick disappears at a relatively early stage after a trend pattern shifts from the pattern E to the pattern F. It can be estimated that the trend pattern will change through sequence F→A→B . . . thereafter.

Further, the above-described method of estimating a trend of a stock price simply indicates a more reliable example that is based on experiences of the applicant. It is needless to mention that estimation of a trend that is performed using a stock price chart according to the present invention is not limited to the above-described method, and can be decided appropriately by the users reading the stock price chart.

In addition, although a "stock price" is an object in all of the above-described embodiments, the present invention is not limited to a "stock price" but can be applied to various other types of market prices (prices of receivables, commodity, derivatives, options, or warrant).

In addition, a stock price chart is mainly explained showing a "daily stick" in the above-described embodiments, a weekly stick and a monthly stick can be explained in the same manner.

As it is evident from the above descriptions, according to the stock price chart of the present invention, since continuity is maintained between adjacent "sticks", a moving line that has a better visual recognition compared with a candlestick is drawn. In addition, since fluctuation momentum of a stock price is represented by a "line" connecting a 'closing price' and a "stick", a stock price chart that is easy to read even for a beginner in stock trading and is preferable for estimation of a trend in a stock price is provided.

What is claimed is:

1. A method of providing a stock price chart in which "sticks" for a predetermined stock brand are arranged in time series on coordinates consisting of a price axis and a time axis, comprising:

calculating, for each of a plurality of specified days for which a "stick" should be displayed, an average closing price of a present evaluation period based on a closing price of the present evaluation period and already obtained closing prices of a prescribed period before that, and an average closing price of a previous evaluation period based on a closing price of the previous evaluation period and already obtained closing prices of the prescribed period before that;

displaying the "stick" wherein an upper end and a lower end of said "stick" are arranged so as to show one of the average closing price for the present evaluation period and the average closing price for the previous evaluation period, respectively, and displaying an indication showing a magnitude relationship between the average closing price for the previous evaluation period and the average closing price for the present evaluation period, and a "line" connecting a coordinate point showing the closing price of the present evaluation period and an upper end or a lower end of a "stick" showing the average closing price for the present evaluation period, added to said "stick", together with an indication showing a magnitude relationship between the closing price for the present evaluation period and the average closing price for the present evaluation period, added to said "line".

2. The method according to claim 1, wherein a first color is applied to said "stick" as an indication showing a magnitude relationship when the closing price for the present evaluation period is 'higher' than an average closing price for the previous evaluation period, and a second color is applied when it is 'lower'.

3. The method according to claim 1, wherein a first color and a second color are applied to said "line" as an indication showing a magnitude relationship when the closing price for the present evaluation period is 'higher' than an average closing price for the present evaluation period, and a second color is applied when it is 'lower'.

4. The method according to claim 1, wherein an 'arrow' whose tip is directed to a coordinate point side showing a closing price is added to said "line".

5. The method according to claims 1, wherein a plurality of types of "sticks" having different 'prescribed period' for calculating an average closing price are simultaneously drawn.

6. The method according to claim 5, wherein the plurality of types of "sticks" with different 'prescribed period' have short-term, medium-term and long-term as three types of classification.

7. A method of providing a stock price chart in which "sticks" for a predetermined stock brand are arranged in time series on coordinates consisting of a price axis and a time axis, comprising:

calculating, for each of a plurality of specified days for which a "stick" should be displayed, an average closing price of a present evaluation period based on a closing price of the present evaluation period and already obtained closing prices of a prescribed period before that, and an average closing price of a previous evaluation period based on a closing price of the previous evaluation period and already obtained closing prices of the prescribed period before that;

displaying a plurality of types of "sticks" having different 'prescribed period' whose upper end and lower end are arranged so as to show one of the average closing price for the present evaluation period and the average closing price for the previous evaluation period, respectively, and displaying an indication showing a magnitude relationship between the average closing price for the previous evaluation period and the average closing price for the present evaluation period, and a "line" connecting a coordinate point showing the closing price of the present evaluation period and the upper end or a lower end of a "stick" showing an average closing price for the present evaluation period, added to one or two or more types of "sticks" selected out of said plurality of types of "sticks", together with an indication showing a magnitude relationship between the closing price for the present evaluation period and the average closing price for the present evaluation period, added to said "line".

8. The method according to claim 7, wherein a first color is applied to said "stick" as an indication showing a magnitude relationship when the closing price for the present evaluation period is 'higher' than an average closing price for the previous evaluation period, and a second color is applied when it is 'lower'.

9. The method according to claim 7, wherein a first color and a second color are applied to said "line" as an indication showing a magnitude relationship when the closing price for the present evaluation period is 'higher' than an average closing price for the present evaluation period, and a second color is applied when it is 'lower'.

10. The method according to claim 7, wherein an 'arrow' whose tip is directed to a coordinate point side showing a closing price is added to said "line".

11. The method according to claim 7, wherein the plurality of types of "sticks" with different 'prescribed period' have short-term, medium-term and long-term as three types of classification.

12. A stock price chart preparation apparatus comprising:

means for storing closing price data for an inputted predetermined stock brand in time series;

calculating means for calculating, for each of a plurality of specified days for which the "stick" should be displayed, an average closing price of present evaluation period based on a closing price of the present evaluation period and already obtained closing prices of the prescribed period before that, and an average closing price of the previous evaluation period based on a closing price of the previous evaluation period and already obtained closing prices of the prescribed period before that;

first display means for displaying a "stick" having an average closing price for the present evaluation period and an average closing price for the previous evaluation period at an upper end or a lower end thereof in time series on coordinates consisting of a price axis and a time axis together with an indication showing a magnitude relationship between the average closing price for the previous evaluation period and the average closing price for the present evaluation period; and second display means for additionally displaying "lines" connecting the upper end or the lower end showing the average closing price for the present evaluation period of each "stick" displayed by said first display means, and a coordinate point of a closing price at that point on coordinates consisting of a price axis and a time axis together with an indication showing a magnitude relationship between the closing price for the present evaluation period and the average closing price for the present evaluation period.

13. The stock price chart preparation apparatus according to claim 12, further comprising:

means for specifying one or two or more types of "sticks" that should be displayed from a plurality types of "sticks" having different 'prescribed period' for calculating an average closing price via operation of a user; and a function for, when two or more types of "sticks" are specified, simultaneously displaying the specified "sticks" via said first display means.

14. The stock price chart preparation apparatus according to claim 13, wherein said first display means has a function for additionally displaying the specified type of "stick" on the coordinates every time each type of "stick" is specified anew, and, erasing the released "stick" from the coordinates every time the specification of each type of "stick" is released.

15. The stock price chart preparation apparatus according to claim 13, further comprising means for specifying one or two or more types of "sticks" for which "lines" should be additionally displayed out of displayed two or more types of "sticks" via operation of a user, wherein, when two or more types of "sticks" for which "lines" should be additionally displayed are specified, the "lines" are additionally displayed for each of the specified two or more types of "sticks" via said second display means.

16. The stock price chart preparation apparatus according to claim 15, wherein said second display means has a function for additionally displaying the "line" on the specified type of "stick" every time each type of "stick" for which a "line" should be additionally displayed is specified anew, and erasing the "line" added to the released "stick" from the coordinates every time the specification of each type of "stick" for which a "line" should be additionally displayed is released.

17. The stock price chart preparation apparatus according to claim 13, wherein the plurality of types of "sticks" with different 'prescribed period' have short-term, medium-term and long-term as three types of classification.

18. The stock price chart preparation apparatus according to claim 12, wherein said first display means applies and displays a first color to said "stick" as an indication showing a magnitude relationship when the closing price of the present evaluation period is 'higher' than an average closing price of the previous evaluation period, and a second color when it is 'lower'.

19. The stock price chart preparation apparatus according to claim 12, wherein said second display means applies and displays a first color to said "line" as an indication showing a magnitude relationship when the closing price of the present evaluation period is 'higher' than an average closing price of the present evaluation period, and a second color when it is 'lower'.

20. The stock price chart preparation apparatus according to claim 12, wherein said second display means adds an 'arrow' whose tip is directed to a coordinate point side showing a closing price to said "line" and displays said "line".

21. A method of providing a market chart in which "sticks" for a predetermined market are arranged in time series on coordinates consisting of a price axis and a time axis, comprising:

calculating, for each of a plurality of specified days for which the "stick" should be displayed, an average closing price of a present evaluation period based on a closing price of the present evaluation period and already obtained closing prices of a prescribed period before that, and an average closing price of a previous evaluation period based on a closing price of the previous evaluation period and already obtained closing prices of the prescribed period before that;

displaying the "stick" wherein an upper end and a lower end of said "stick" are arranged so as to show one of the average closing price of the present evaluation period and the average closing price of the previous evaluation period, respectively, displaying a magnitude relationship between the average closing price of the previous evaluation period and the average closing price of the present evaluation period, and a "line" connecting a coordinate point showing the closing price of the present evaluation period and an upper end or a lower end of a "stick" showing the average closing price of the present evaluation period, added to said "stick", together with an indication showing a magnitude relationship between the closing price of the present evaluation period and the average closing price of the present evaluation period, added to said "line".

22. A market chart preparation apparatus comprising:

means for storing closing price data for an inputted predetermined market in time series;

calculating means for calculating, for each of a plurality of specified days for which the "stick" should be displayed, an average closing price of the present evaluation period based on a closing price of the present evaluation period and already obtained closing prices of the prescribed period before that, and an average closing price of the previous evaluation period based on a closing price of the previous evaluation period and already obtained closing prices of the prescribed period before that;

first display means for displaying a "stick" having an average closing price of the present evaluation period and an average closing price of the previous evaluation period at an upper end or a lower end thereof in time series on coordinates consisting of a price axis and a time axis together with an indication showing a magnitude relationship between the average closing price of the previous evaluation period and the average closing price of the present evaluation period; and second display means for additionally displaying a "line" connecting the upper end or the lower end indicating the average closing price of the present evaluation period of each "stick" displayed by said first display means, and a coordinate point of a closing price at that point on coordinates consisting of a price axis and a time axis together with an indication showing a magnitude relationship between the closing price of the present evaluation period and the average closing price of the present evaluation period.

23. A computer readable medium having a computer program executable by a computer to perform the method of:

providing a stock price chart in which "sticks" for a predetermined stock brand are arranged in time series on coordinates consisting of a price axis and a time axis, comprising:

calculating, for each of a plurality of specified days for which a "stick" should be displayed, an average closing price of a present evaluation period based on a closing price of the present evaluation period and already obtained closing prices of a prescribed period before that, and an average closing price of a previous evaluation period based on a closing price of the previous evaluation period and already obtained closing prices of the prescribed period before that;

displaying the "stick" wherein an upper end and a lower end of said "stick" are arranged so as to show one of-an the average closing price for the present evaluation an and the average closing price for the previous evaluation period and obtained respectively, and displaying an indication showing a magnitude relationship between the average closing price for the previous evaluation period and the average closing price for the present evaluation period, and a "line" connecting a coordinate point showing the closing price of the present evaluation period and an upper end or a lower end of a "stick" showing the average closing price for the present evaluation period added to said "stick", and together with an indication showing a magnitude relationship between the closing price for the present evaluation period and the average closing price for the present evaluation period added to said "line".

24. A computer readable medium having a computer program executable by a computer to operate the apparatus comprising:
means for storing closing price data for an inputted predetermined stock brand in time series;
calculating means for calculating, for each of a plurality of specified days for which the "stick" should be displayed, an average closing price of present evaluation period based on a closing price of the present evaluation period and already obtained closing prices of the prescribed period before that, and an average closing price of the previous evaluation period based on a closing price of the previous evaluation period and already obtained closing prices of the prescribed period before that;
first display means for displaying a "stick" having an average closing price for the present evaluation period and an average closing price for the previous evaluation period at an upper end or a lower end thereof in time series on coordinates consisting of a price axis and a time axis together with an indication showing a magnitude relationship between the average closing price for the previous evaluation period and the average closing price for the present evaluation period; and
second display means for additionally displaying "lines" connecting the upper end or the lower end showing the average closing price for the present evaluation period of each "stick" displayed by said first display means, and a coordinate point of a closing price at that point on coordinates consisting of a price axis and a time axis together with an indication showing a
magnitude relationship between the closing price for the present evaluation period and the average closing price for the present evaluation period.

25. A computer-readable medium having a computer program executable by a computer to perform the method of
providing a market chart in which "sticks" for a predetermined market are arranged in time series on coordinates consisting of a price axis and a time axis, comprising:
calculating, for each of a plurality of specified days for which the "stick" should be displayed, an average closing price of a present evaluation period based on a closing price of the present evaluation period and already obtained closing prices of a prescribed period before that, and an average closing price of a previous evaluation period based on a closing price of the previous evaluation period and already obtained closing prices of the prescribed period before that;
displaying the "stick" wherein an upper end and a lower end of said "stick" are arranged so as to show one of -a the average closing price of the present evaluation and the average closing price of the previous evaluation period evaluation and obtained respectively,
displaying a magnitude relationship between the average closing price of the previous evaluation period and the average closing price of the present evaluation period, and a "line" connecting a coordinate point showing the closing price of the present evaluation period and an upper end or a lower end of a "stick" showing the average closing price of the present evaluation period-ar-e added to said "stick", a
together with an indication showing a magnitude relationship between the closing price of the present evaluation period and the average closing price of the present evaluation period-isadded to said "line".

26. A computer-readable medium having a computer program executable by a computer to operate the market chart preparation apparatus comprising: means for storing closing price data for an inputted predetermined market in time series; calculating means for calculating, for each of a plurality of specified days for which the "stick" should be displayed, an average closing price of the present evaluation period based on a closing price of the present evaluation period and already obtained closing prices of the prescribed period before that, and an average closing price of the previous evaluation period based on a closing price of the previous evaluation period and already obtained closing prices of the prescribed period before that;
first display means for displaying a "stick" having an average closing price of the present evaluation period and an average closing price of the previous evaluation period at an upper end or a lower end thereof in time series on coordinates consisting of a price axis and a time axis together with an indication showing a magnitude relationship between the average closing price of the previous evaluation period and the average closing price of the present evaluation period; and
second display means for additionally displaying a "line" connecting the upper end or the lower end indicating the average closing price of the present evaluation period of each "stick" displayed by said first display means, and a coordinate point of a closing price at that point on coordinates consisting of a price axis and a time axis together with an indication
showing a magnitude relationship between the closing price of the present evaluation period and the average closing price of the present evaluation period.

27. A stock price chart preparation apparatus comprising:
means for storing closing price data for an inputted predetermined market in time series;
calculating means for calculating, for each of a plurality of specified days for which the "stick" should be displayed, an average closing price of a present evaluation period based on a closing price of the present evaluation period and already obtained closing prices of a prescribed period before that, and an average closing price of a previous evaluation period based on a closing price of the previous evaluation period and already obtained closing prices of the prescribed period before that;
first display means for displaying a plurality of types of "sticks" having different 'prescribed period' whose upper end and lower end are arranged so as to show one of the average closing price for the present evaluation period and the average closing price for the previous evaluation period, respectively; and
second display means for displaying, for one or two or more types of "sticks" selected out of said plurality of types of "sticks", an indication of a magnitude relationship between the average closing price for the previous evaluation period and the average closing price for the present evaluation period, and a "line" connecting a coordinate point showing the closing price of the present evaluation period and the upper end or a lower end of a "stick" showing an average closing price for the present evaluation, together with an indication of a magnitude relationship between the closing price for the present evaluation period and the average closing price for the present evaluation period.

28. A computer-readable medium having a computer program executable by a computer to perform the method of:

Providing a stock price chart in which "sticks" for a predetermined stock brand are arranged in time series on coordinates consisting of a price axis and a time axis, comprising:

calculating, for each of a plurality of specified days for which a "stick" should be displayed, an average closing price of a present evaluation period based on a closing price of the present evaluation period and already obtained closing prices of a prescribed period before that, and an average closing price of a previous evaluation period based on a closing price of the previous evaluation period and already obtained closing prices of the prescribed period before that;

Wherein displaying a plurality of types of "sticks" having different 'prescribed period'-are drawn whose upper end and lower end are arranged so as to show one of-an the average closing price for the present evaluation period evaluation for the before that and an and the average closing price for the previous evaluation period that, respectively, and displaying an indication showing a magnitude relationship between the average closing price for the previous evaluation period and the average closing price for the present evaluation period, and a "line" connecting a coordinate point showing the closing price of the present evaluation period and the upper end or a lower end of a "stick" showing an average closing price for the present evaluation period-are, added to one or two or more types of "sticks" selected out of said plurality of types of "sticks", and together with an indication showing a magnitude relationship between the closing price for the present evaluation period and the average closing price for the present evaluation periods added to said "line".

29. A computer-readable medium having a computer program executable by a computer to operate the apparatus of:

A stock price chart preparation apparatus comprising: means for storing closing price data for an inputted predetermined market in time series; calculating means for calculating, for each of a plurality of specified days for which the "stick" should be displayed, an average closing price of a present evaluation period based on a closing price of the present evaluation period and already obtained closing prices of a prescribed period before that, and an average closing price of a previous evaluation period based on a closing price of the previous evaluation period and already obtained closing prices of the prescribed period before that;

first display means for displaying a plurality of types of "sticks" having different 'prescribed period' whose upper end and lower end are arranged so as to show one of the average closing price for the present evaluation period and the average closing price for the previous evaluation period, respectively; and second display means for displaying, for one or two or more types of "sticks" selected out of said plurality of types of "sticks", an indication of a magnitude relationship between the average closing price for the previous evaluation period and the average closing price for the present evaluation period, and a "line" connecting a coordinate point showing the closing price of the present evaluation period and the upper end or a lower end of a "stick" showing an average closing price for the present evaluation, together with an indication of a magnitude relationship between the closing price for the present evaluation period and the average closing price for the present evaluation period.

* * * * *